(12) United States Patent
Bradshaw

(10) Patent No.: US 11,806,905 B2
(45) Date of Patent: Nov. 7, 2023

(54) MOLDS, MOLD ASSEMBLIES AND STACK COMPONENTS

(71) Applicant: HUSKY INJECTION MOLDING SYSTEMS LTD., Bolton (CA)

(72) Inventor: Maxfield Paul Bradshaw, Etobicoke (CA)

(73) Assignee: HUSKY INJECTION MOLDING SYSTEMS LTD, Bolton (CA)

( * ) Notice: Subject to any disclaimer, the term of this patent is extended or adjusted under 35 U.S.C. 154(b) by 308 days.

(21) Appl. No.: 17/299,497

(22) PCT Filed: Nov. 21, 2019

(86) PCT No.: PCT/CA2019/051665
§ 371 (c)(1),
(2) Date: Jun. 3, 2021

(87) PCT Pub. No.: WO2020/118413
PCT Pub. Date: Jun. 18, 2020

(65) Prior Publication Data
US 2022/0080637 A1    Mar. 17, 2022

Related U.S. Application Data

(60) Provisional application No. 62/841,288, filed on May 1, 2019, provisional application No. 62/778,028, filed on Dec. 11, 2018.

(51) Int. Cl.
*B29C 45/40* (2006.01)
*B29C 45/32* (2006.01)
(Continued)

(52) U.S. Cl.
CPC .......... *B29C 45/4005* (2013.01); *B29B 11/08* (2013.01); *B29C 45/322* (2013.01);
(Continued)

(58) Field of Classification Search
CPC .............. B29C 45/4005; B29C 45/322; B29C 2045/2683; B29C 2045/324;
(Continued)

(56) References Cited

U.S. PATENT DOCUMENTS 4,207,051 A    6/1980   Wright et al.
4,775,130 A    10/1988   Von Holdt
(Continued)

FOREIGN PATENT DOCUMENTS

CA    2741937 A1    1/2012
CN    102729407 A    10/2012
(Continued)

*Primary Examiner* — Emmanuel S Luk

(57) ABSTRACT

An injection mold (100) including a core plate assembly (200), a cavity plate assembly (400) and a stripper plate assembly (300) arranged between the core and cavity plate assemblies (200, 400). The mold (100) includes a plurality of mold stacks (MS) with a molding configuration, in which the mold stacks (MS) are closed to define molding cavities. A gap (G) is provided between the core plate (210) and the stripper plate (310) when the mold (100) is in the molding configuration, such that a clamping load (CL) applied to urge the core plate (210) toward the cavity plate (410) is directed substantially entirely through the mold stacks (MS).

15 Claims, 19 Drawing Sheets

(51) Int. Cl.
*B29B 11/08* (2006.01)
*B29C 45/26* (2006.01)

(52) U.S. Cl.
CPC ............... *B29C 2045/2683* (2013.01); *B29C 2045/324* (2013.01); *B29C 2045/4078* (2013.01)

(58) Field of Classification Search
CPC ........ B29C 2045/4078; B29C 45/7312; B29C 45/261; B29C 45/40; B29C 45/26; B29B 11/08
See application file for complete search history.

(56) References Cited

U.S. PATENT DOCUMENTS

| | | | |
|---|---|---|---|
| 4,856,977 | A | 8/1989 | Von Holdt |
| 5,232,718 | A | 8/1993 | Miyazawa et al. |
| 5,271,875 | A | 12/1993 | Appleton et al. |
| 5,312,243 | A | 5/1994 | Mertz |
| 5,466,147 | A | 11/1995 | Appleton et al. |
| 5,780,068 | A | 7/1998 | Shinohara |
| 6,015,283 | A | 1/2000 | Mattia |
| 6,569,370 | B1 | 5/2003 | Amin et al. |
| 2001/0038163 | A1 | 11/2001 | Matysek |
| 2002/0122841 | A1 | 9/2002 | Joseph |
| 2002/0146483 | A1 | 10/2002 | Mai et al. |
| 2004/0123640 | A1 | 7/2004 | Rooney |
| 2006/0283210 | A1 | 12/2006 | Dubuis et al. |
| 2007/0212443 | A1 | 9/2007 | Li et al. |
| 2008/0026239 | A1 | 1/2008 | Balboni et al. |
| 2008/0268086 | A1 | 10/2008 | Kmoch et al. |
| 2008/0268088 | A1* | 10/2008 | Kmoch ............... B29C 45/2711 425/589 |
| 2008/0268089 | A1* | 10/2008 | Kmoch ............... B29C 45/2711 425/548 |
| 2008/0268090 | A1 | 10/2008 | Kmoch et al. |
| 2009/0020915 | A1 | 1/2009 | Mai et al. |
| 2009/0068307 | A1* | 3/2009 | McCready ............ B29C 45/7312 425/552 |
| 2009/0155404 | A1 | 6/2009 | Mai |
| 2011/0111079 | A1* | 5/2011 | Mccready ............... B29C 45/33 425/525 |
| 2012/0025423 | A1* | 2/2012 | McCready .............. B29C 45/40 425/577 |
| 2012/0038076 | A1 | 2/2012 | Lausenhammer et al. |
| 2013/0029004 | A1 | 1/2013 | Looije |
| 2013/0142902 | A1* | 6/2013 | Papa ................... B29C 45/1775 425/577 |
| 2013/0216643 | A1 | 8/2013 | Papa |
| 2013/0243897 | A1 | 9/2013 | Mccready et al. |
| 2014/0010909 | A1 | 1/2014 | Mccready |
| 2015/0069662 | A1 | 3/2015 | Mai et al. |
| 2017/0001352 | A1 | 1/2017 | Kunz |
| 2018/0162031 | A1 | 6/2018 | Mai |
| 2021/0170653 | A1* | 6/2021 | Papa ....................... B29C 45/44 |

FOREIGN PATENT DOCUMENTS

| | | |
|---|---|---|
| CN | 203765941 U | 8/2014 |
| CN | 205705102 U | 11/2016 |
| DE | 3140711 A1 | 4/1983 |
| GB | 1035620 A | 7/1966 |
| JP | 9029784 A | 2/1997 |
| WO | 2005102650 A1 | 11/2005 |
| WO | 2007101322 A1 | 9/2007 |
| WO | 2007101351 A1 | 9/2007 |
| WO | 2009012559 A1 | 1/2009 |
| WO | 2009103146 A1 | 8/2009 |
| WO | 2012019304 A1 | 2/2012 |
| WO | 2014186884 A1 | 11/2014 |
| WO | 2018098564 A1 | 6/2018 |
| WO | 2018107273 A1 | 6/2018 |
| WO | 2018232499 A1 | 12/2018 |

* cited by examiner

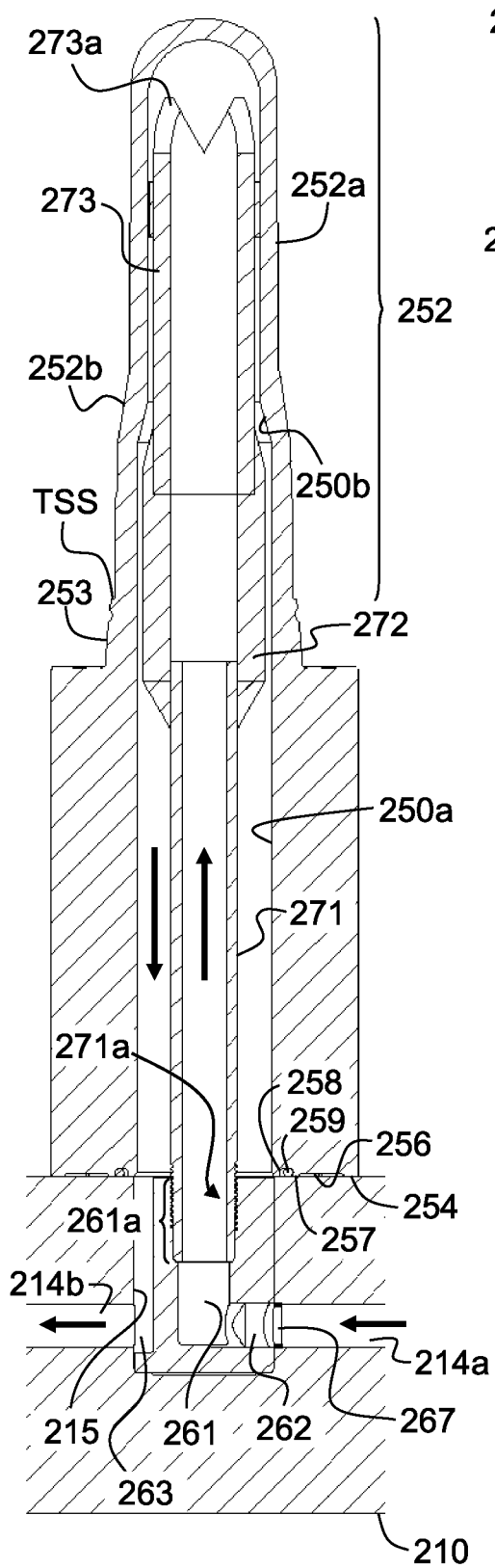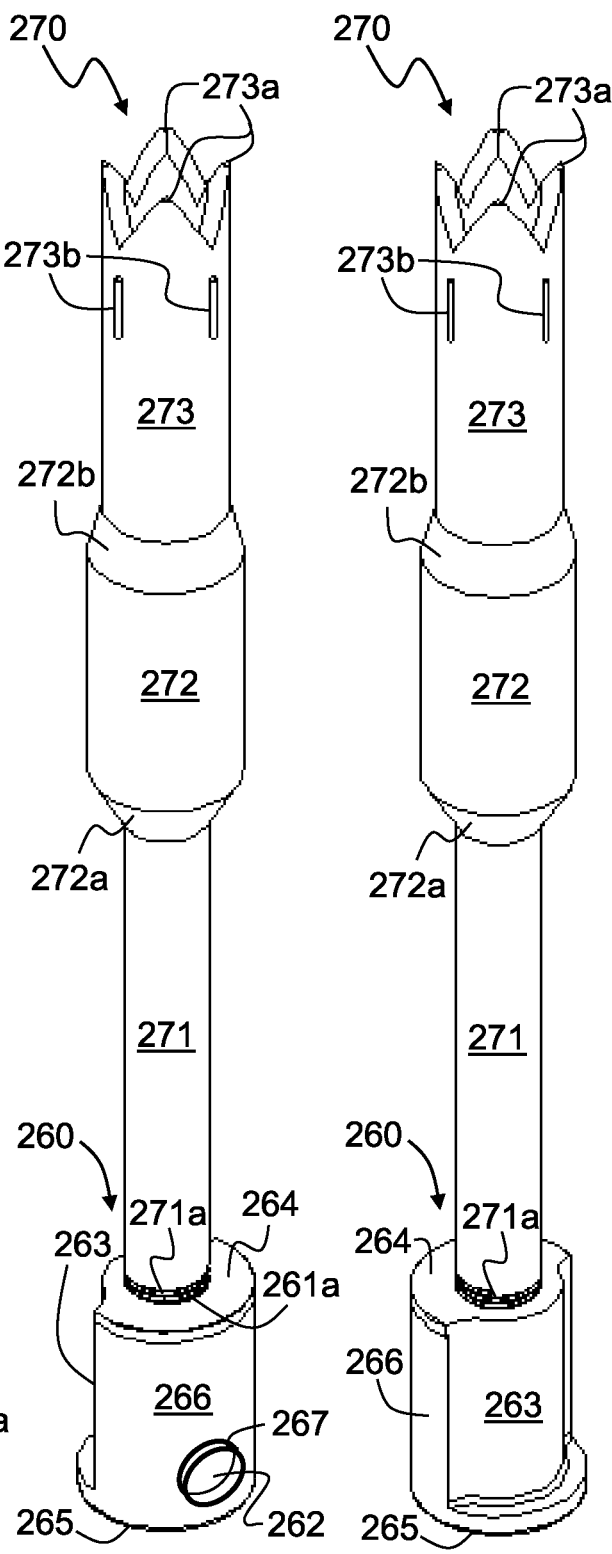
FIG. 6    FIG. 7    FIG. 8

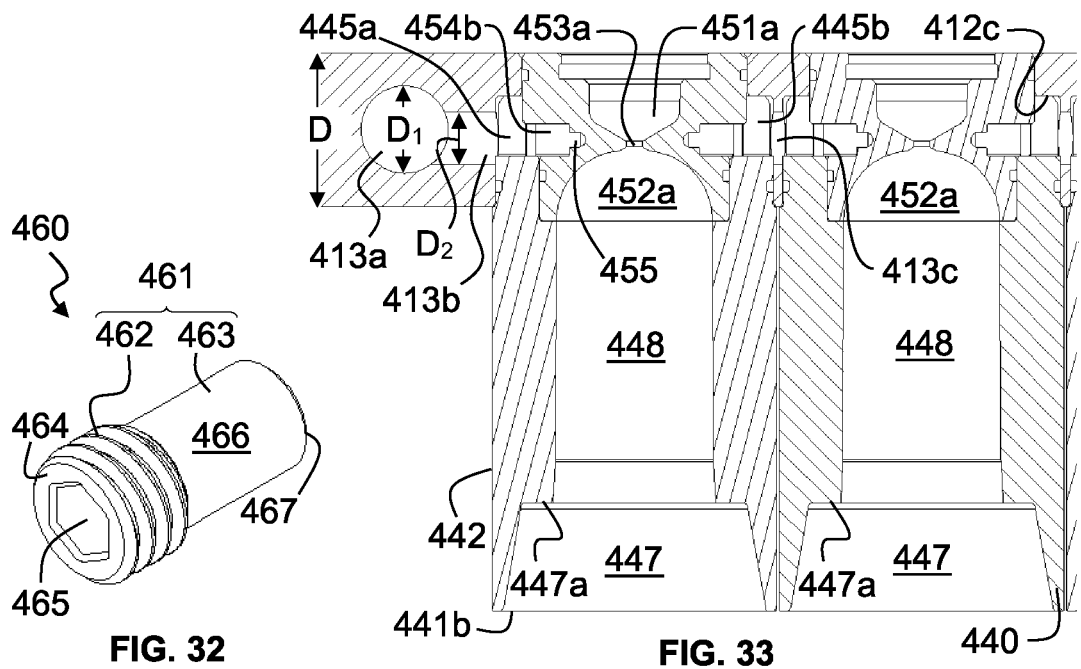
FIG. 32
FIG. 33
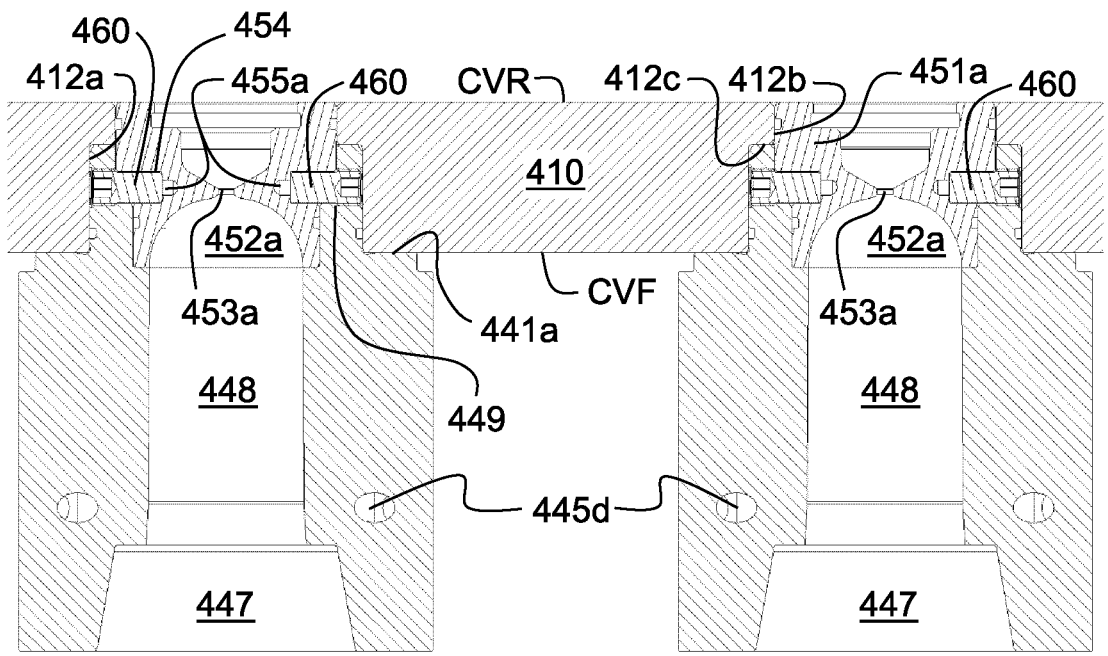
FIG. 34

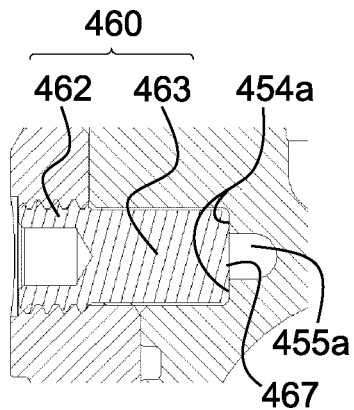 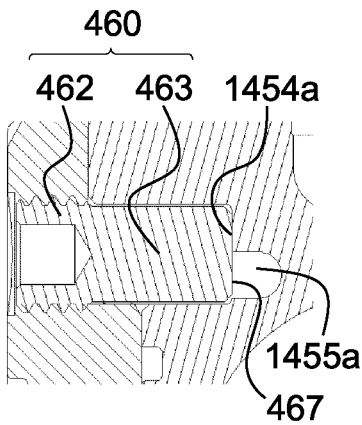 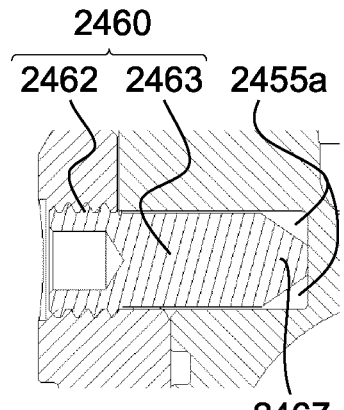
FIG. 35　　　FIG. 36　　　FIG. 37
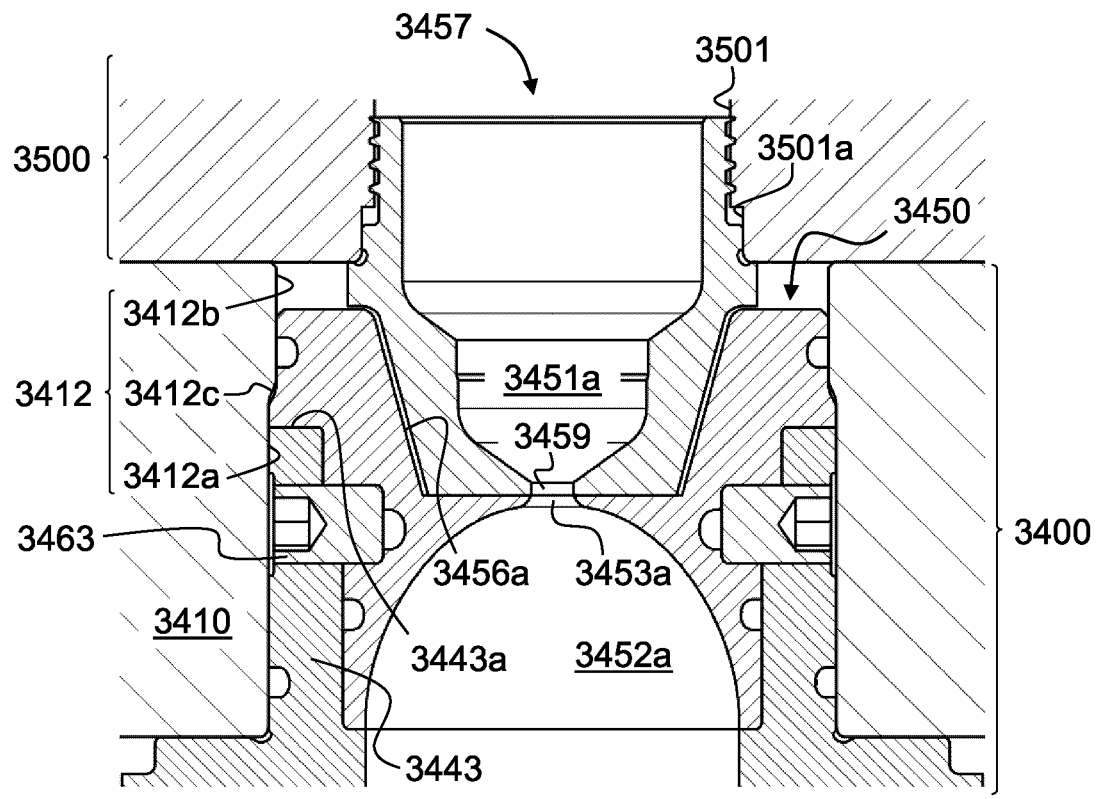
FIG. 38

MOLDS, MOLD ASSEMBLIES AND STACK COMPONENTS

FIELD OF THE INVENTION

This invention relates generally to molding apparatus and associated methods. More specifically, although not exclusively, this invention relates to mold stacks, mold assemblies, molds, molding systems for molding preforms and other articles, for example tubular articles, and to associated methods.

BACKGROUND OF THE INVENTION

Molding is a process by virtue of which a molded article can be formed from molding material, such as a plastics material, by using a molding system, such as an injection molding system or a compression molding system. Various molded articles can be formed by using such molding processes including, for example, preforms which can be formed from polyethylene terephthalate (PET) material. Such preforms are capable of being subsequently blown into a container, for example a beverage container, bottle, can or the like.

As an illustration, injection molding of preforms involves heating PET material (or other suitable molding material for that matter) to a homogeneous molten state and injecting, under pressure, the so-melted material into a molding cavity defined, at least in part, by a female cavity piece and a male core piece. Typically, the female cavity piece is mounted to a cavity plate and the male core piece is mounted to a core plate of a mold. The cavity plate and the core plate are urged together and are held together by clamp force, the clamp force being sufficient to keep the cavity and the core pieces together against the pressure of the injected material. The molding cavity has a shape that substantially corresponds to a final cold-state shape of the molded article to be molded. The so-injected material is then cooled to a temperature sufficient to enable removal of the so-formed molded article from the molding cavity. When cooled, the molded article shrinks inside of the molding cavity and, as such, when the cavity and core plates are urged apart, the molded article tends to remain associated with the core piece.

Accordingly, by urging the core plate away from the cavity plate, the molded article can be subsequently demolded by ejecting it off the core piece. Ejection structures are known to assist in removing the molded articles from the core halves. Examples of the ejection structures include stripper plates, stripper rings and neck rings, ejector pins, etc.

When dealing with molding a preform that is capable of being subsequently blown into a beverage container, one consideration that needs to be addressed is forming a so-called "neck region". Typically and as an example, the neck region includes (i) engaging features, such as threads (or other suitable structure), for accepting and retaining a closure assembly (ex. a bottle cap), and (ii) an anti-pilferage assembly to cooperate, for example, with the closure assembly to indicate whether the end product (i.e. the beverage container that has been filled with a beverage and shipped to a store) has been tampered with in any way. The neck region may comprise other additional elements used for various purposes, such as to cooperate with parts of the molding system (ex. a support ledge, etc.). As is appreciated in the art, the neck region cannot be formed easily by using the cavity and core halves. Traditionally, split mold inserts (sometimes referred to by those skilled in the art as "neck ring") have been used to form the neck region.

A typical molding insert stack assembly that can be arranged (in use) within a molding machine includes a split mold insert pair that, together with a mold cavity insert, a gate insert and a core insert, defines a molding cavity. Molding material can be injected into the molding cavity from a source of molding material via a receptacle or port in the gate insert to form a molded article. In order to facilitate forming of the neck region of the molded article and subsequent removal of the molded article therefrom, the split mold insert pair comprises a pair of complementary split mold inserts that are mounted on adjacent slides of a slide pair. The slide pair is slidably mounted on a top surface of a stripper plate.

As commonly known, the stripper plate is configured to be movable relative to the cavity insert and the core insert, when the mold is arranged in an open configuration. As such, the slide pair, and the complementary split mold inserts mounted thereon, can be driven laterally, via a cam arrangement or any other suitable known means, for the release of the molded article from the molding cavity. One of the functions performed by the split mold insert pair is to assist in ejecting the molded article off the core insert by "sliding" the molded article off the core insert.

SUMMARY OF THE INVENTION

The present invention seeks to provide a means of directing the clamping load through a mold along predetermined load paths, with a view to reducing complexity and/or cost. This invention is directed, in particular but not exclusively, to mold stacks, molds, mold assemblies, molding systems and associated methods for molding articles, specifically but not exclusively tubular articles such as preforms. In the case of tubular articles such as preforms, the articles may have a base portion at a closed end, a neck finish at an open end and a body portion therebetween. The neck finish may include one or more radial flanges, which may extend outwardly. The neck finish may include engaging features, such as threads or a snap fit finish. The preform and/or neck finish may comprise any one or more other features described above in relation to known preform designs. In addition, any of the foregoing features described in relation to known mold stacks, molds and molding systems may be incorporated within mold stacks, molds and molding systems according to the invention, insofar as they are consistent with the disclosure herein.

According to a first broad aspect of the present invention, there is provided a mold, e.g. an injection mold, comprising: a core plate assembly, a cavity plate assembly and a stripper plate assembly arranged between the core and cavity plate assemblies; a plurality of mold stacks, each of which includes a core insert, a cavity insert and a split mold insert pair arranged therebetween; the core plate assembly including a core plate having a plurality of the core inserts mounted thereon; the stripper plate assembly including a stripper plate with a bearing surface upon which a plurality of slide pairs are slidably supported, each slide pair being configured to retain a subset of the split mold inserts thereon; the cavity plate assembly including a cavity plate having a plurality of the cavity inserts mounted thereon; wherein the mold comprises a molding configuration in which the mold stacks are closed to define molding cavities and the stack height is configured such that a clamping load applied, in use, to urge the core plate toward the cavity plate is directed substantially entirely through the mold stacks.

The mold may be configured such that a gap may be provided between the slides and the bearing surface, e.g. when the mold is in the molding configuration. Additionally or alternatively, a gap may be provided between the core plate and the stripper plate, e.g. when the mold is in the molding configuration.

Another aspect of the invention provides a mold, e.g. an injection mold, comprising: a core plate assembly, a cavity plate assembly and a stripper plate assembly arranged between the core and cavity plate assemblies; a plurality of mold stacks, each of which includes a core insert, a cavity insert and a split mold insert pair arranged therebetween; the core plate assembly including a core plate having a plurality of the core inserts mounted thereon; the stripper plate assembly including a stripper plate with a bearing surface upon which a plurality of slide pairs are slidably supported, each slide pair being configured to retain a subset of the split mold inserts thereon; the cavity plate assembly including a cavity plate having a plurality of the cavity inserts mounted thereon; wherein the mold comprises a molding configuration in which the mold stacks are closed to define molding cavities and a gap is provided between the core plate and the stripper plate such that a clamping load applied, in use, to urge the core plate toward the cavity plate is directed substantially entirely through the mold stacks.

The distance between the split mold inserts and the core plate may be greater than the thickness of stripper plate assembly, or parts thereof, which are received therebetween, e.g. when the mold is in the molding configuration. The distance between the split mold inserts and the core plate may be configured to prevent the clamping load from being directed through the stripper plate assembly. The distance between the split mold inserts and the core plate may be greater than the combined thickness of the slide pairs, stripper plate and bearing surface, e.g. when the mold is in the molding configuration, for example to prevent the clamping load from being directed through the stripper plate assembly and/or to provide the gap.

The distance between the slides and the core plate may be greater than the thickness of the stripper plate or the combined thickness of the stripper plate and bearing surface, e.g. when the mold is in the molding configuration, for example to prevent the clamping load from being directed through the stripper plate assembly and/or to provide the gap.

At least one or each cavity insert may comprise a spigot, which may be received in a respective seat of the cavity plate. At least one or each cavity insert may comprise a shoulder, e.g. surrounding at least part of the spigot and/or engaging a front face of the cavity plate. The spigot may be shorter than the depth of the cavity plate, e.g. such that some, most or substantially all of the applied clamping load is directed from the core plate through the mold stack, e.g. via the shoulder of the cavity insert, to the cavity plate and/or such that none of the applied clamping load is directed through the spigot.

The cavity plate may comprise a front face and/or a rear face. At least one or each seat may comprise a first seat portion, which may extend from the front face. At least one or each seat may comprise a second seat portion, which may extend from the rear face. The first seat portion may be larger than the second seat portion, e.g. with a shoulder described therebetween. The front face may comprise a mounting interface adjacent each seat, e.g. to which each cavity insert is mounted. The spigot of the cavity insert may be received within the first seat portion and/or may abut against the shoulder. In some examples, some or most of the applied clamping load is directed from the core plate through the mold stack, e.g. via the spigot of the cavity insert, to the cavity plate and/or some or most of the applied clamping load is directed from the core plate through the mold stack via the shoulder of the cavity insert to the cavity plate.

The mold may comprise a gate insert, which may be at least partially received within each seat of the cavity plate. Additionally or alternatively, each cavity insert may comprise a gate insert seat within which each gate insert is at least partially received. The or each gate insert may cooperate with the cavity insert spigot received in the seat, e.g. to enable molten material to be injected into the cavity. The or each gate insert may extend from the spigot and/or into the or a respective second seat portion. The or each gate insert may be recessed with respect to a rear side or face, e.g. a melt distributor mounting side or face, of the cavity plate, for example to substantially inhibit the applied clamping load from being directed from the melt distributor through the gate inserts. The or each gate insert may be shorter than the depth of the second seat portion.

The or each gate insert may include a nozzle seat or nozzle tip recess, e.g. for receiving a nozzle tip of a melt distributor. The gate insert may comprise a body, which may be substantially cylindrical. The gate insert or body may describe a nozzle seat, e.g. in a first end of the body. The gate insert may comprise a molding cavity portion, e.g. in a second end of the body. The gate insert may comprise a gate, which may join the nozzle seat to the molding cavity portion.

In some cases, only a portion of the clamping load is directed through the mold stacks if or once a predetermined threshold clamping load is exceeded. The mold may comprise one or more columns, e.g. between the core plate and cavity plate. At least a portion of the clamping load may be directed through the one or more columns, e.g. if or once the predetermined clamping load is exceeded. At least a portion of the clamping load may be directed through the stripper plate assembly, e.g. if or once the predetermined clamping load is exceeded.

Another aspect of the invention provides a mold stack, e.g. for use in an injection mold as described above, the mold stack comprising a core insert, a cavity insert and a split mold insert pair arranged therebetween, wherein the mold stack comprises a closed, molding configuration in which molding cavities are defined therebetween and in which a clamping load applied, in use, to urge a core plate, to which the core insert is mounted, toward a cavity plate, to which the cavity insert is mounted, is directed substantially entirely through the mold stacks.

The core may be for mounting or mountable to a core plate or core plate assembly. The cavity may be for mounting or mountable to a cavity plate or cavity plate assembly. The split mold insert pair may be for mounting or mountable to a stripper plate or stripper plate assembly, which may be arranged, in use, between the core and cavity plate assemblies. The stack height may be configured such that a clamping load applied, in use, to urge the core plate toward the cavity plate is directed substantially entirely through the mold stacks.

The split mold insert pair may describe a first taper, e.g. a male taper, which may be on a first side thereof. The first taper may comprise a radial surface and a tapered surface. The split mold insert pair may describe a second taper, e.g. a female taper, which may be on a second side thereof. The split mold insert pair may describe a lateral or radial surface, which may extend from the second taper.

The cavity insert may comprise a taper, e.g. a female taper, which may be on a split mold insert facing side thereof. The cavity insert taper may comprise a radial surface and a tapered surface. The first taper of the split mold insert pair may engage the cavity insert taper, which may be a corresponding taper of the cavity insert. The core insert may comprise a taper, e.g. a male taper. The second taper of the split mold insert pair may engage the core insert taper, which may be a corresponding taper of the core insert. The core may comprise an annular support surface, which may extend radially, e.g. from the core insert taper. A portion of the lateral or radial surface may engage the annular support surface of the core insert.

The first taper may comprise a projected area, which may be in the direction of the clamping load, for example it may comprise a load transmission area or projected load transmission area. The second taper may comprise a projected area, which may be in the direction of the clamping load, for example it may comprise a load transmission area or projected load transmission area. The second taper and radial surface portion that engages the annular support surface of the core insert may together comprise a projected area, which may be in the direction of the clamping load, for example it may comprise a load transmission area or projected load transmission area.

The projected area of the first taper may be substantially the same as that of the second taper and radial surface.

The stripper assembly may comprise one or more guide shafts mounted on or secured to the stripper plate. The stripper plate assembly may comprise a pair of guide shafts mounted or secured, e.g. in parallel, across opposing sides of the stripper plate. Each slide of each slide pair may slidably receive at least one of the guide shafts. Each slide of each slide pair may slidably receive one of the guide shafts through each of its ends. Each slide may be movable along the guide shaft(s) relative to the stripper plate and/or relative to one another.

Another aspect of the invention provides a stripper assembly, comprising: a stripper plate; a pair of guide shafts secured, in parallel, across opposing sides of the stripper plate; and a plurality of slide pairs slidably supported on a bearing surface of the stripper plate; wherein each slide of each slide pair slidably receives one of the guide shafts through each of its ends such that each slide is movable along the pair of guide shafts relative to the stripper plate and relative to one another.

The stripper plate assembly may comprise a guide shaft mounted on or secured to an upper portion of the stripper plate. The stripper plate assembly may comprise a guide shaft mounted on or secured to a lower portion of the stripper plate. Each slide pair may comprise a first slide and a second slide. The first and second slides of each slide pair may be movable along the guide shaft(s) relative to the stripper plate and/or relative to one another.

The mold may comprise a pair of connecting bars, which may be mounted to the slides. Each connecting bar may secure together a respective one of the slides of each slide pair, e.g. for synchronized movement thereof. The mold may comprise a pair of, e.g. first and second, connecting bars mounted at each end of the slide pairs. Each connecting bar of each pair may secure together a respective one of the slides of each slide pair, e.g. for synchronized movement thereof. For example, the connecting bars may include a first connecting bar secured to each first slide of each slide pair. The connecting bars may include a second connecting bar secured to each second slide of each slide pair. The first connecting bar may synchronize movement of all of the first slides and/or the second connecting bar may synchronize movement of all of the second slides. The connecting bars may be mounted to the front of the slides. The connecting bars may have a substantially square or rectangular, e.g. featureless, cross-section.

At least one or each guide shaft may be mounted to the stripper plate by a plurality of guide brackets. The guide brackets may comprise a pair of end brackets, each of which may be secure or mount a respective end of the guide shaft. The guide brackets may comprise one or more intermediate brackets, which may secure or mount respective intermediate portions of the guide shaft. At least one or each guide bracket may comprise a base and/or a clamp member. The base may comprise a cradle or support surface, which may be curved or semi-cylindrical, for receiving the guide shaft. The base may comprise a block with a recess providing or forming the cradle or support surface. The base may comprise one or more, e.g. a pair of, mounting holes, which may extend through its thickness. The base may comprise a mounting hole on either side of the cradle or support surface.

The clamp member may comprise a curved or semi-cylindrical clamping surface, e.g. for receiving the guide shaft. The clamp member may comprise a block with a recess providing or forming the clamping surface. The clamp member may comprise one or more, e.g. a pair of, mounting holes, which may extend through its thickness. The clamp member may comprise a mounting hole on either side of the clamping surface. Each guide bracket may comprise a pair of fasteners, such as bolts, each of which may extend through a hole in the clamp member and through a hole in the base to threadedly engage a threaded hole in the stripper plate.

Another aspect of the invention provides a mold part or half, e.g. a moving part or half of a mold, comprising the stripper plate assembly described above and a core plate assembly comprising a core plate having a plurality of the core inserts mounted thereon.

Another aspect of the invention provides a mold, e.g. a preform mold or an injection mold, comprising the stripper plate assembly described above.

The mold may comprise an injection mold, e.g. a preform injection mold.

Another aspect of the invention provides a molding system comprising a mold as described above. The molding system may comprise one or more of a melt distributor, an injection molding machine, a material supply system and a part removal and/or post mold cooling apparatus.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising one or more mold components described above.

Another aspect of the invention provides a method of assembling a mold assembly or mold as described above. Various steps and features of the method will be apparent to the skilled person.

Another aspect of the invention provides a method of molding articles. The method may comprise the use of one of the aforementioned mold stacks, molds, mold assemblies or molding systems. The method may comprise any one or more features or steps relevant to or involving the use of any feature of any of the aforementioned mold stacks, molds, mold assemblies or molding systems.

For the avoidance of doubt, any of the features described herein apply equally to any aspect of the invention. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which:

FIG. 6 depicts a section view through one of the core assemblies and an adjacent portion of the core plate to which the core assembly is secured;

FIG. 7 depicts a core cooling tube assembly of the core assembly of FIG. 6 shown from a first side;

FIG. 8 depicts the core cooling tube assembly of FIG. 7 shown from a second side;

FIG. 32 depicts one of the retaining pins of the cavity assembly of FIG. 28;

FIG. 33 depicts a partial section view of the cavity plate assembly through a column of cavity inserts of the cavity plate assembly of FIG. 27;

FIG. 34 depicts a partial section view of the cavity plate assembly through a row of cavity inserts of the cavity plate assembly of FIG. 27;

FIG. 35 depicts an enlarged view of the bypass and retaining pin region of the partial section view of FIG. 34;

FIG. 36 depicts a similar view to FIG. 35 illustrating an alternative bypass channel configuration;

FIG. 37 depicts a similar view to FIGS. 35 and 36 illustrating an alternative retaining pin configuration in which the bypass channel is described between the retaining pin and the cavity insert;

FIG. 38 depicts a partial section view of the gate region of an alternative cavity plate assembly in which a gate pad is provided between the nozzle tip and gate insert;

DETAILED DESCRIPTION OF THE INVENTION

Figure 1:
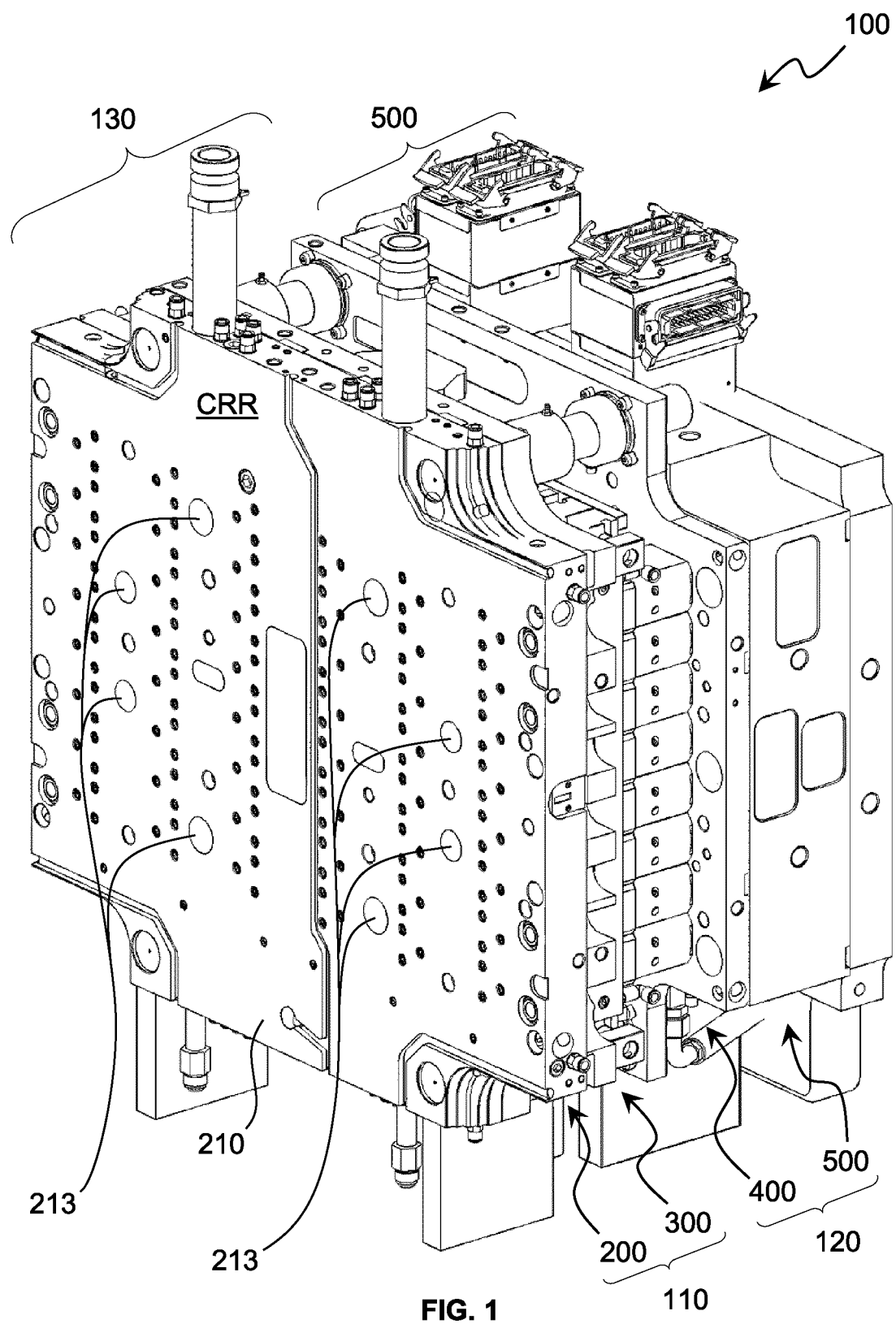
FIG. 1 depicts a preform mold assembly according to an embodiment of the invention.
Figure 2:
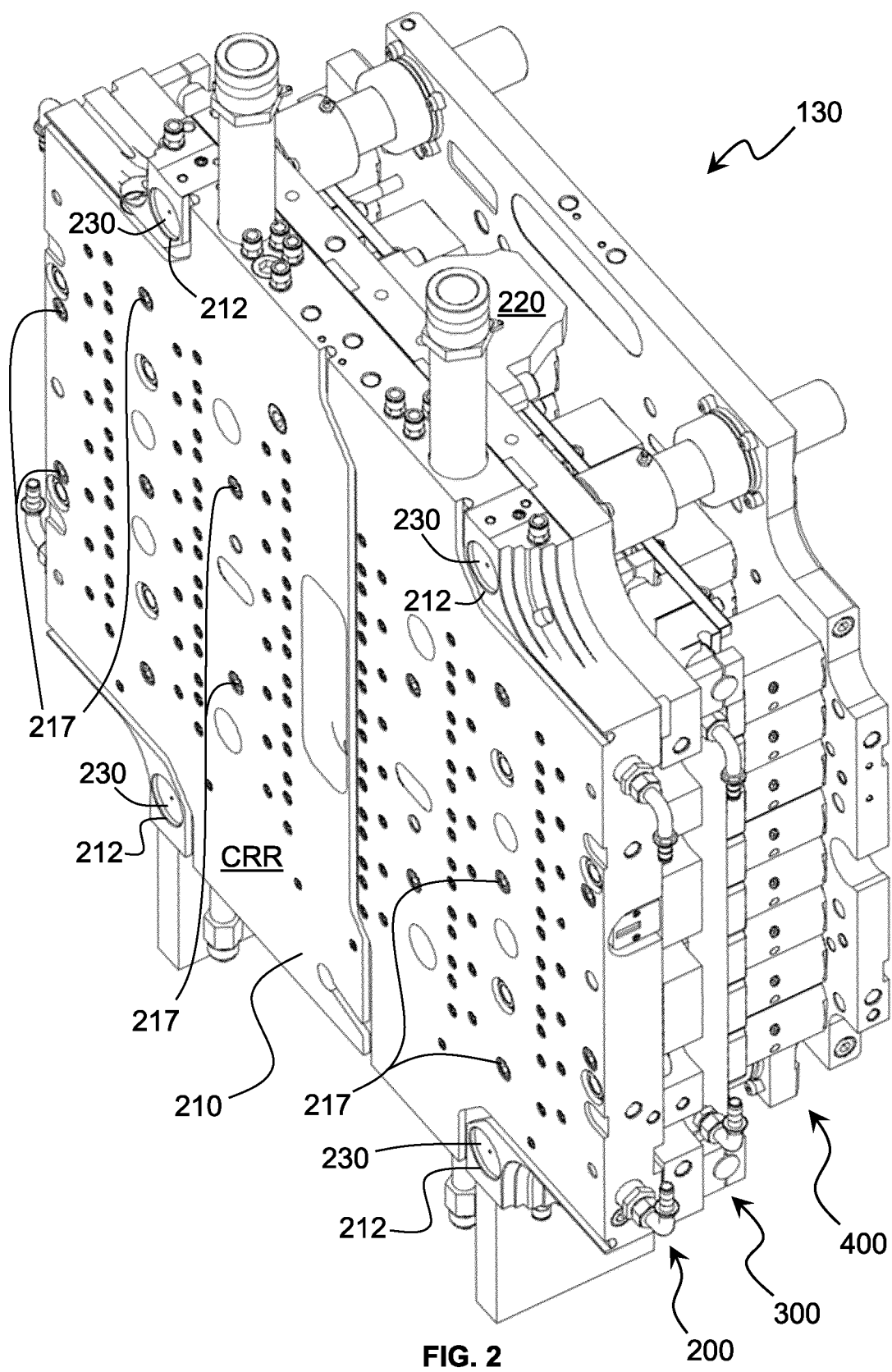
FIG. 2 depicts the preform mold assembly of FIG. 1 with the melt distributor omitted.

With reference to FIGS. 1 and 2, there is depicted a non-limiting embodiment of a preform mold assembly 100 according to the invention, which includes forty-eight cavities in this embodiment. The mold assembly 100 includes a first, moving part 110 for mounting to the moving platen (not shown) of an injection molding machine (not shown) and a second, stationary part 120 for mounting to the stationary platen (not shown) in the usual way. The first, moving part 110 includes a core plate assembly 200 and a stripper plate assembly 300. The second, stationary part 120 includes a cavity plate assembly 400 and a melt distributor 500, commonly referred to as a hot runner. In this embodiment, the melt distributor 500 is of a conventional type. This invention is particularly concerned with the product specific assembly 130 shown in FIG. 2, commonly referred to as the 'cold half' 130. The cold half 130 includes the core plate assembly 200, stripper plate assembly 300 and cavity plate assembly 400.

Figure 3:
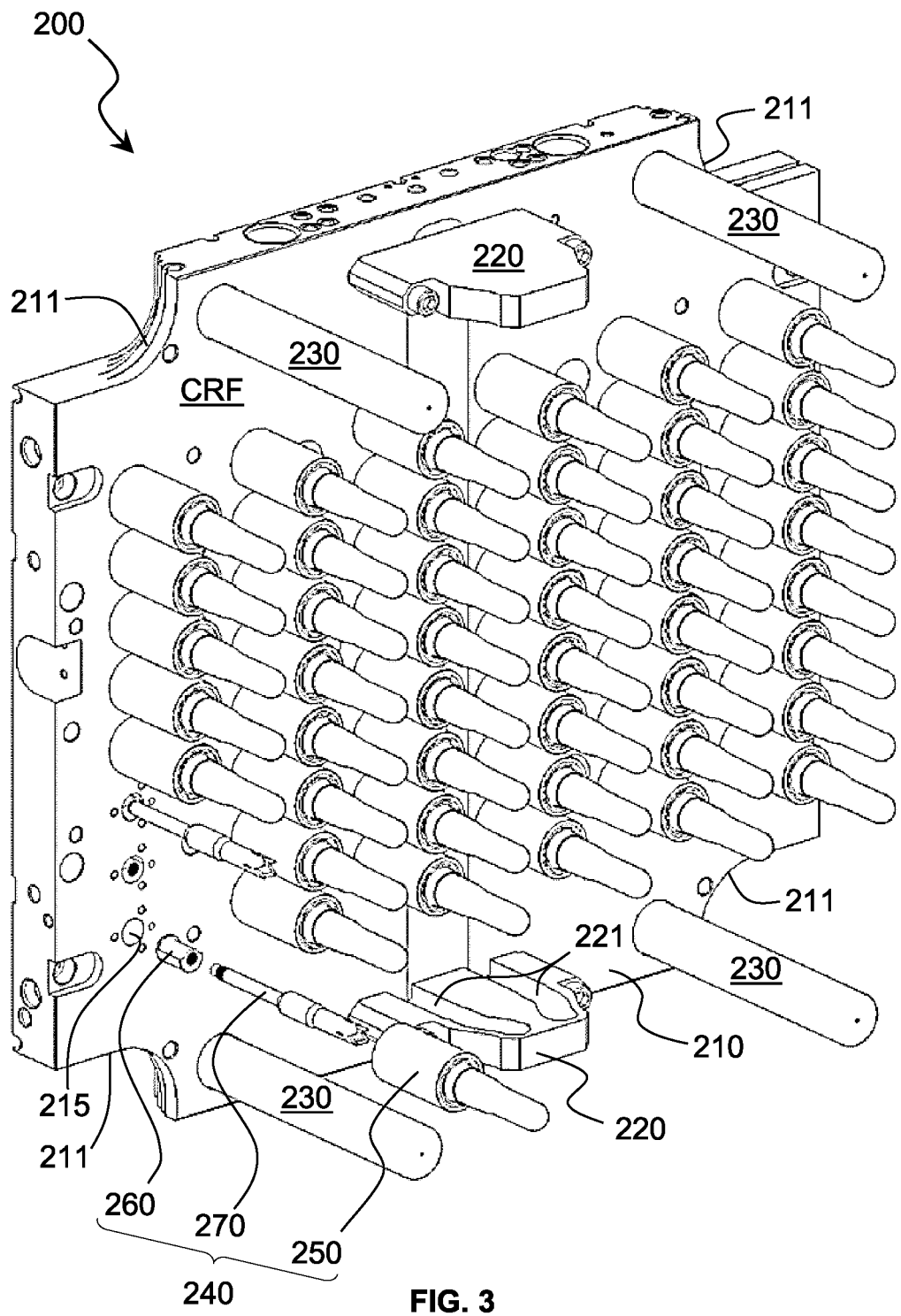
FIG. 3 depicts the core plate assembly of the preform mold assembly of FIGS. 1 and 2 with one core omitted and another core assembly shown exploded.
Figure 4:
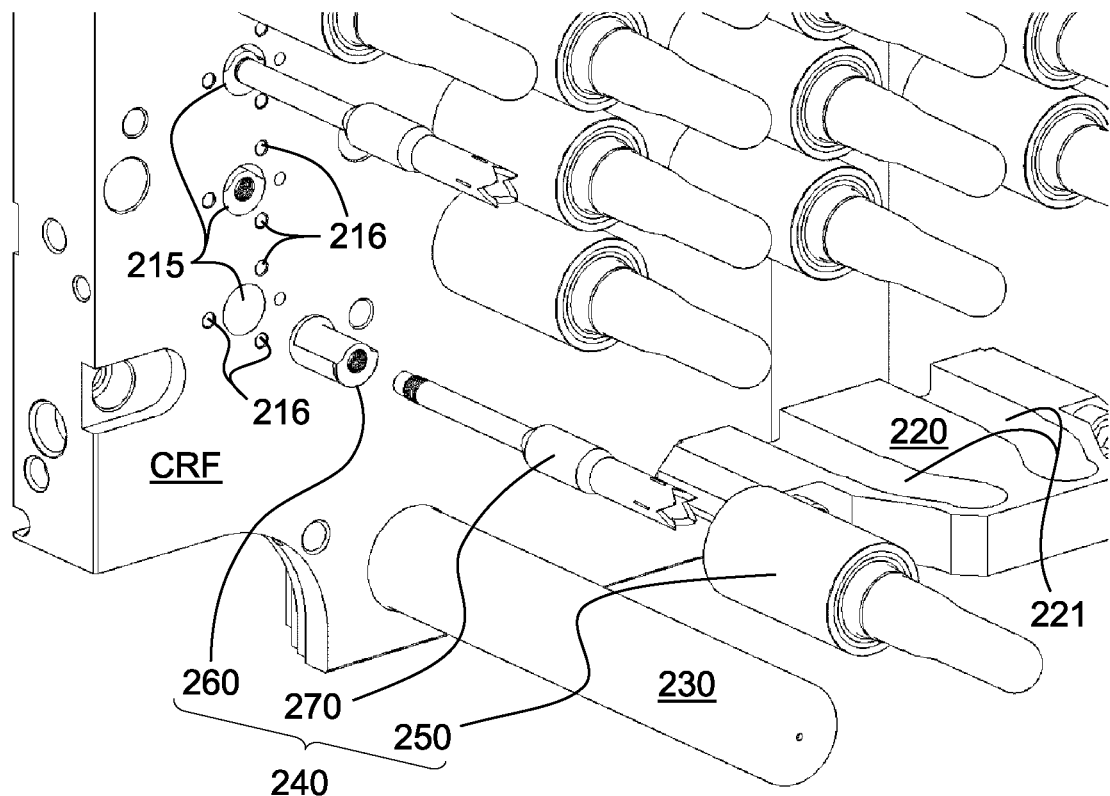
FIG. 4 depicts an enlarged view of the region of FIG. 3 which includes the exploded core assembly.

As shown more clearly in FIGS. 3 and 4, the core plate assembly 200 includes a core plate 210, a pair of cam plates 220, four guide pins 230 and a plurality of core assemblies 240. The core plate 210 is substantially rectangular in plan with scalloped corners 211, for accommodating the tiebars (not shown) of an injection molding machine (not shown) within which the mold is mounted. The core plate 210 also includes four guide pin holes 212 through its thickness, which are horizontally inboard of each scalloped corner 211 and securely receive the guide pins 230. The core plate 210 also includes a plurality of ejector holes 213 through its thickness, for accommodating ejector pins (not shown).

A network of cooling channels 214a, 214b is included within the core plate 210, which feed into a plurality of cooling channel seats 215 in a front face CRF of the core plate 210 (as illustrated in FIG. 6). The cooling channel seats 215 are arranged in an array of six vertical columns and eight horizontal rows. Each seat 215 is surrounded by three core mounting holes 216, which extend through the thickness of the core plate 210 and are counterbored on a rear face CRR of the core plate 210. An array of coupling bolts 217 are also inserted into holes in the core plate 210, which are also counterbored on the rear face CRR. One of the cam plates 220 is bolted to a central, lower region of the front face CRF of the core plate 210 and includes a pair of cam slots 221 on its upper surface. The other cam plate 220 is bolted to a central, upper region of the front face CRF of the core plate 210 and includes a similar pair of cam slots 221 on its lower surface. Both cam plates 220 have the same configuration, varying only in their orientation. The cam slots 221 of each cam plate 220 extend perpendicularly from the front face CRF and converge toward the free end of the cam plate 220.

As illustrated more clearly in FIGS. 4 to 8, each core assembly 240 includes a hollow core insert 250 and a core cooling tube assembly 260, 270. In this example, the core cooling tube assembly 260, 270 includes a coolant diverter 260 received in one of the cooling channel seats 215 of the core plate 210 and a core cooling tube 270 releasably secured to the coolant diverter 260 and received within the hollow core insert 250.

Each core insert 250 includes a substantially cylindrical base 251 and a molding portion 252 joined to the base 251 by a taper 253. The molding portion 252 has an outer molding surface 252a, for molding an inner surface of a preform in the usual way, a tapering transition region 252b for molding a transition region between neck and body regions of the preform and a top sealing surface portion TSS for molding part of the top sealing surface of a preform. The core taper 253 extends from the top sealing surface portion TSS to a front surface 251a of the base 251 and includes a single, male taper 253 for a stack configuration known in the art as a so-called 'cavity-lock' design. However, it will be appreciated that the core insert 250 may be of the so-called 'core-lock' design without departing from the scope of the invention.

Figure 5:
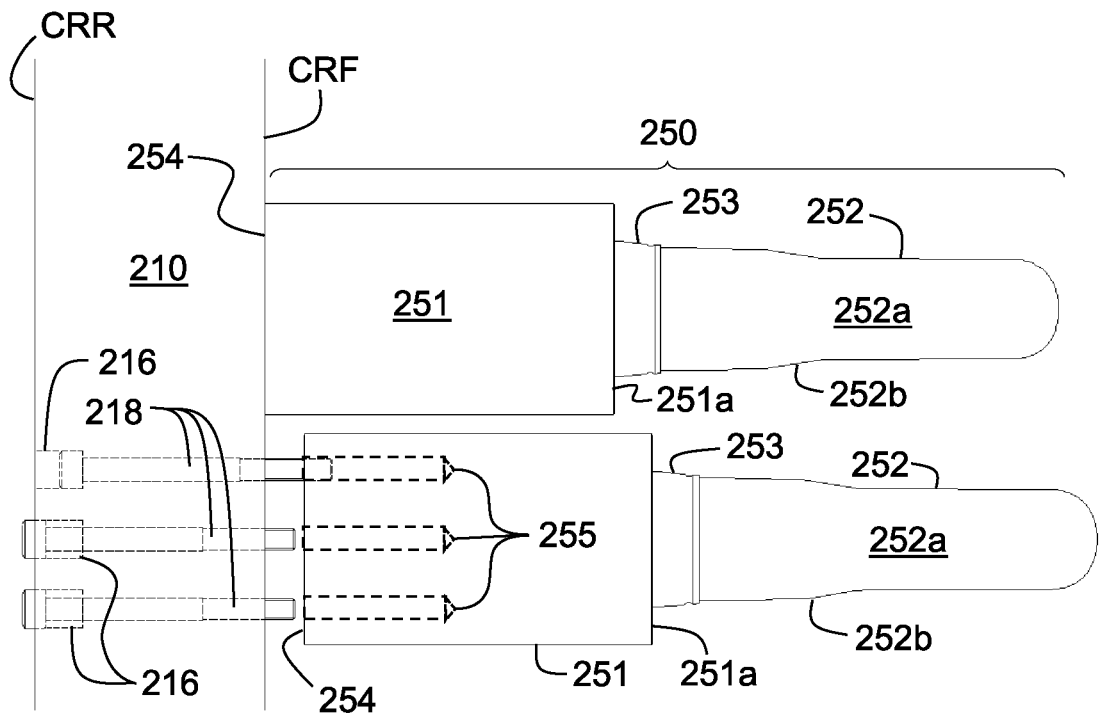
FIG. 5 depicts a side view of part of the core plate assembly of FIGS. 3 and 4 illustrating the mounting of one of the cores to the core plate.

In this example, each core insert 250 includes a substantially planar mounting surface 254 and three threaded blind holes 255 extending from the mounting surface 254. The core inserts 250 are therefore mounted from the rear, or rear mounted, whereby bolts 218 are inserted into the core mounting holes 216 from the rear face CRR of the core plate 210 and threadedly engage the threaded holes 255 of the core inserts 250. This is illustrated in FIG. 5. This rear mounting enables the core inserts 250 to be secured from the rear of the core plate 210. As such, the pitch between the core inserts 250 can be reduced without obstructing access to the bolts 218, as would be the case with traditional core inserts having a flange with through holes for receiving front mounted bolts 218.

As discussed in more detail below, this rear mounting, in combination with the substantially planar mounting surface 254, also enables the core inserts 250 to be mounted loosely to the front face CRF of the core plate 210 in a floating manner and fixed securely relative thereto after the mold 100 or cold half 130 is fully assembled. More specifically, by loosely tightening the bolts 218, the clearances between them and the core mounting holes 216 allow a degree of sliding movement between the mounting surfaces 254 of the core inserts 250 and the front face CRF. The mounting surface 254 describes a terminal end of the core insert 250 and is free of any projections, thereby to enable the core inserts 250 to slide relative to the core plate 210. With the mold 100 or cold half 130 in an assembled condition, the bolts 218 are still accessible from the rear face CRR of the core plate 210 and can therefore be torqued to fix the core inserts 250 securely to the core plate 210.

It is also envisaged, however, that the core insert 250 could be provided with a spigot that extends from the mounting surface 254. In some cases, the spigot (not shown) could be smaller than the seat 215 in the core plate 210 to enable some sliding movement therebetween. In other examples, the spigot may be substantially the same size as the seat 215 in the core plate 210.

Referring now to FIG. 6, each core insert 250 includes a central bore 250a extending from the mounting surface 254 to a hemispherical or domed, closed end adjacent the free end of the molding portion 252. The central bore 250a includes a tapering, intermediate region 250b corresponding to the tapering transition region 252b of the outer molding surface 252a. As such, the wall thickness between the central bore 250a and the outer molding surface 252a remains substantially constant along the entire molding portion 252. The mounting surface 254 also includes a shallow recess 256 surrounding the central bore 250a and defining therebetween a shutoff surface 257. The shutoff surface 257 also includes an O-ring groove 258 between the recess 256 and the central bore 250a, within which an O-ring 259 is received for sealing the interface between the central bore 250a and the core plate 210.

Each coolant diverter 260, shown in FIGS. 6 to 8, is substantially cylindrical and includes an axial blind bore 261, a radial bore 262 orthogonal to the axial bore 261 and a peripheral recess 263 parallel to the axial bore 261. The axial bore 261 extends from an upper surface 264 of the diverter 260 and terminates adjacent a lower surface 265 thereof. The axial bore 261 includes an enlarged portion 261a extending from the upper surface 264 and is threaded along part of its length to provide a connector for the core cooling tube 270. The radial bore 262 extends from the blind end of the axial bore 261 to a circumferential surface 266 on the opposite side of the diverter 260 to the peripheral recess 263. The axial bore 261 and radial bore 262 together provide a first cooling channel 261, 262 of the coolant diverter 260.

The peripheral recess 263 extends about approximately half of the circumference of the diverter 260 from the upper surface 264 toward the lower surface 265, terminating on an opposite side to the axial bore 261 such that the circumferential surface 266 extends around the entire periphery of the lower end of the diverter 260. The peripheral recess 263 cooperates with a facing surface of the cooling channel seat 215 to describe a second cooling channel of the coolant diverter 260, with an inlet described at the front face CRF of the core plate 210 and an outlet corresponding to the opening of the facing cooling channel 214b in the cooling channel seat 215.

Each coolant diverter 260 also includes a locator in the form of a retaining lip 267, which projects from the circumferential surface 266 about the periphery of the opening of the radial bore 262. The coolant diverter 260 is formed of a resilient plastics material, such that the retaining lip 267 is resiliently deformable. As such, insertion of the diverter 260 into the cooling channel seat 215 causes the retaining lip 267 to deform resiliently until both the depth and orientation of the diverter 260 within the cooling channel seat 215 are such that the radial bore 262 is aligned with a facing cooling channel 214a. Upon alignment between the radial bore 262 and the cooling channel 214a, the retaining lip 267 snaps into the cooling channel 214a and returns to its original shape. As a result, the retaining lip 267 provides a snap fit connector, acting both as a locating means, ensuring proper alignment of the radial bore 262 and cooling channel 214a, and as a retaining means for retaining the diverter 260 within the cooling channel seats 215. In this orientation, the peripheral recess 263 is aligned with a cooling channel 214b on the opposite side of the cooling channel seat 215. Whilst the retaining lip 267 is a convenient and preferred configuration, it may be replaced with a depression for receiving a projection on a facing surface of the cooling channel seat 215.

Each core cooling tube 270 includes first, second and third tubular segments 271, 272, 273. The first tubular segment 271 has a first outer diameter, the second tubular segment 272 has a second outer diameter, larger than the first outer diameter, and the third tubular segment 273 has a third outer diameter between the first and second outer diameters. The second tubular segment 272 also includes tapered ends 272a, 272b, which provide a transition between the three diameters. The outer surfaces of the second and third segments 272, 273 correspond broadly to the profile of the central bore 250a of the core insert 250 within which the core cooling tube 270 is received, which is configured to provide a predetermined flow area between the outer surface of the core cooling tube 270 and the central bore 250a to maximise cooling effectiveness.

The first tubular segment 271 includes an externally threaded lower end 271a, which is received within, and threadedly engages the internal threads of, the enlarged axial bore portion 261a of one of the coolant diverters 260. The inner diameter of the second tubular segment 272 is larger than that of the first tubular segment 271, an upper end of which is received in the second tubular segment 272. The inner diameters of the second and third tubular segments 272, 273 are substantially the same. The third tubular segment 273 is secured at its lower end to the second tubular segment 272 and includes an upper, free end which has a jagged-toothed profile including four pointed teeth 273a.

The third tubular segment 273 also includes spacing vanes 273b in an intermediate portion thereof, adjacent but spaced from the teeth 273a and aligned between each pair of teeth 273a.

The teeth 273a ensure that any unintended forward movement of the core cooling tube 270 caused by fluid pressure flowing therethrough does not close off the flow between the core cooling tube 270 and the internal, domed end of the central bore 250a of the core insert 250. The spacing vanes 273b ensure that the core cooling tube 270 is also located centrally within the core insert 250. These spacing vanes 273b are configured to restrict radial movement of the core cooling tubes 270 by engaging against facing surfaces of the central bore 250a of the core insert 250. This arrangement maintains the position of the core cooling tube 270 within the central bore 250a, thereby ensuring that the flow profile of the cooling fluid is distributed substantially evenly therealong.

The flow direction of cooling fluid from the cooling channels 214a, 214b is indicated by the arrows in FIG. 6. As shown, cooling fluid flows from a first, inlet cooling channel 214a into the radial bore 262 of the coolant diverter 260, which acts as an inlet portion of first cooling channel 261, 262, then flows up and out of the axial bore 261, which acts as an outlet portion. The cooling fluid then flows through and out of the core cooling tube 270 to impact the center of the domed end of the central bore 250a of the core insert 250. The domed end of the core insert 250 then causes the flow to reverse, in an umbrella-like fashion to the annular gap between the outer surface of the core cooling tube 270 and the central bore 250a. However, it will be appreciated that the cooling fluid flow could otherwise flow through in the opposite direction.

The outer surface of the core cooling tube 270 corresponds broadly to the profile of the central bore 250a of the core insert 250 within the molding portion 252, thereby to provide a predetermined annular flow area, which is less than the flow area within the core cooling tube 270. As such, the cooling fluid is throttled along this annular flow area to create a turbulent flow to increase heat transfer between the molding portion 252 and the cooling fluid. The cooling fluid then flows into the peripheral recess 263 of the coolant diverter 260 and out of the cooling channel 214b on the opposite side of the cooling channel seat 215. As such, the peripheral recess 263 acts as an outlet for the cooling fluid back into the network of cooling channels 214a, 214b.

The coolant diverter 260 is formed of a resilient plastics material, such as by molding or additive manufacturing. However, the skilled person will appreciate that it is also possible to form the coolant diverter 260 from a different, more rigid plastics or metallic material, with the retaining lip 267 being provided either as an insert made of a resilient material or formed by overmolding the body of the coolant diverter 260 with a resilient material. In addition, the core cooling tube 270 is formed of stainless steel, with the tubular segments 271, 272, 273 and spacing vanes 273b being brazed together. However, the core cooling tube 270 may instead be formed as a unitary body, such as by an additive manufacturing technique. The core cooling tube 270 may be formed of a different material, which may be a metallic or plastics material, and/or may be formed by any other suitable process.

Figure 9:
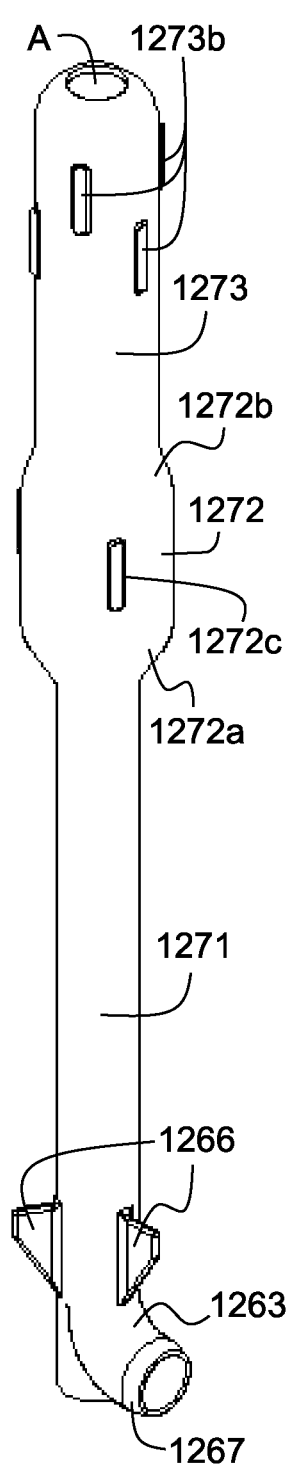
FIG. 9 depicts an alternative, unitary core cooling tube assembly shown from a first side.
Figure 10:
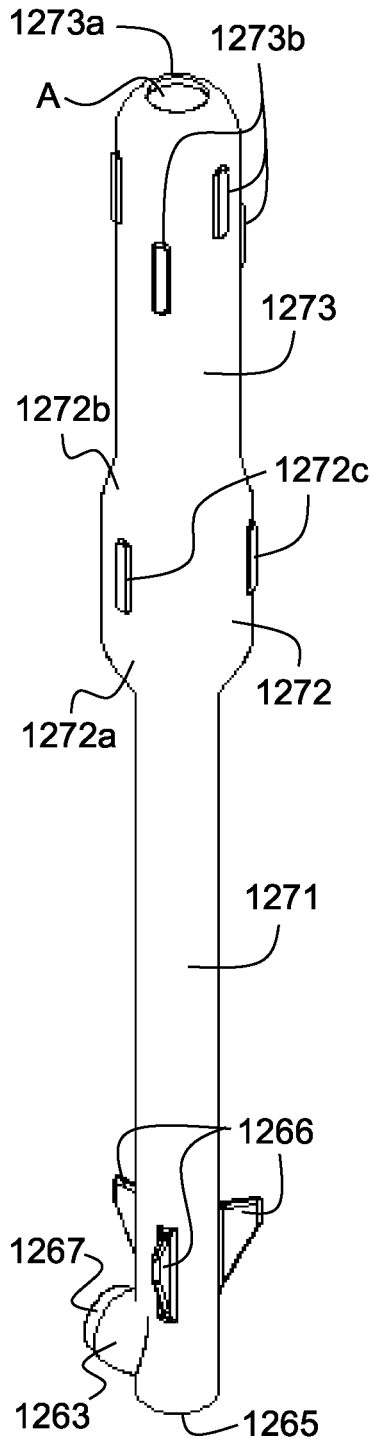
FIG. 10 depicts the core cooling tube assembly of FIG. 9 shown from a second side.
Figure 11:
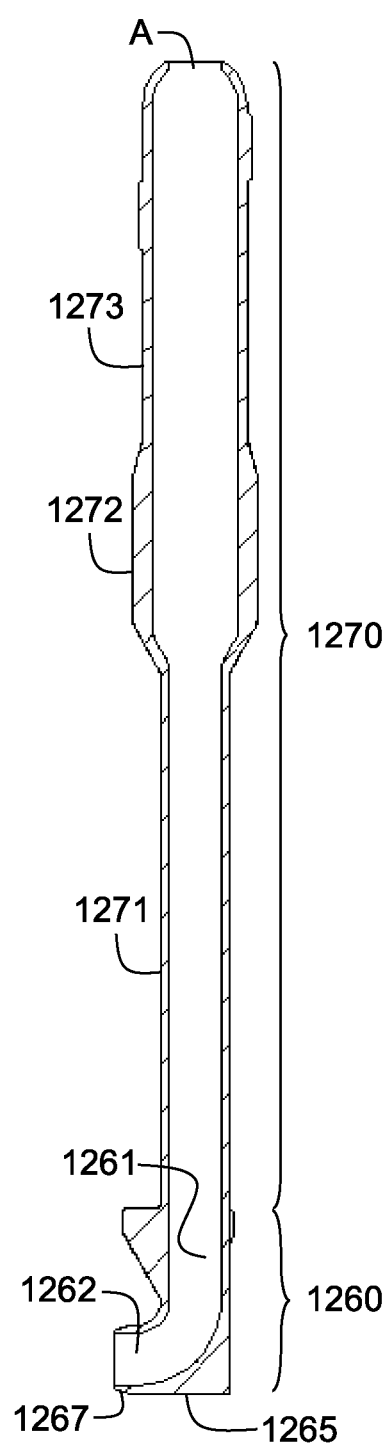
FIG. 11 depicts a section view along a central, axial plane through the core cooling tube assembly of FIGS. 9 and 10.

FIGS. 9 to 11 illustrate an alternative core cooling tube assembly 1260, 1270, which is similar to the core cooling tube assembly 260, 270 described above, wherein like features are labelled with like references with the addition of a preceding '1'. As shown, this core cooling tube 1270 differs, inter alia, in that the first, second and third tubular segments 1271, 1272, 1273 and the coolant diverter 1260 are all formed integrally. The third tubular segment 1273 of the core cooling tube 1270 also includes an open end 1273a described by a truncated dome 1273a, in place of the jagged-toothed end of the core cooling tube 270 described above.

The provision of a jagged-toothed end is not necessary in this example, since the core cooling tube 1270 and coolant diverter 1260 are integral in this example and there is little risk of separation. In addition, the truncated dome 1273a includes an aperture A having a smaller diameter than the bore in the third tubular segment 1273, thereby describing a flow area which is less than the flow area through the third tubular segment 1273. As a result, cooling fluid flowing through the core cooling tube 1270 accelerates as it flows out through the aperture A. This configuration also focuses the flow directly toward a central region of the domed end of the central bore 250a of the core insert 250, before the flow is reversed as described above. This reduction in flow area to provide an accelerated, directed flow has been found to improve cooling performance.

In contrast, the teeth 273a in the core cooling tube 270 described above provide an effective increase in the flow area as compared with the flow area through the third tubular segment 273. Indeed, some of the flow of coolant fluid from the third tubular segment 273 will exit through the spaces between the teeth 273a and be entrained with the reversed flow through the annular gap between the outer surface of the core cooling tube 270 and the central bore 250a of the core insert 250, thereby avoiding the domed end of the central bore 250a of the core insert 250.

It will be appreciated by those skilled in the art that this, end region of the core insert 250 is exposed to the highest temperatures, since molten plastic introduced into the cavity impinges directly on it during the molding process. As such, the reduction in flow area and directed flow toward this region of the core insert 250, which are provided by the core cooling tube 1270 according to this example, are particularly beneficial.

The coolant diverter 1260 is a continuation of the first tubular segment 1271, with a gradual, curved tubular transition portion 1263 between the axial bore 1261 and the radial bore 1262. The coolant diverter 1260 also includes three spacer fins 1266, which center it within the cooling channel seat 215 of the core plate 210. The radial bore 1262 and curved transition joining it to the axial bore 1261 are formed by the tubular transition portion 1263, which has a substantially constant thickness, thereby maximizing the flow area around the coolant diverter 1260, as compared with the shallow recess 263 of the coolant diverter 260 shown in FIGS. 6 to 8. This alleviates the flow restriction created by the recess 263, thereby reducing the pressure drop as the cooling fluid travels out of the core insert 250 back into the network of cooling channels 214a, 214b.

A retaining lip 1267 is formed by a tapered end of the tubular transition portion 1263, which functions in a similar manner to the retaining lip 267 described above. The integral structure is formed of a suitable plastics material, which is sufficiently resilient to enable the retaining lip 1267 to deform resiliently upon insertion of the coolant diverter 1260 into the cooling channel seat 215, to snap into the cooling channel 214a and return to its original shape. However, the core cooling tube 1270 should be formed of a material that is also sufficiently rigid for it to retain its shape under the pressure of the cooling fluid. In an effort to mitigate the effects of any deformation of the core cooling tube 1270, the second tubular segment 1272 includes three spacing vanes 1272c spaced equally about its periphery and the third tubular segment 1273 includes six spacing vanes 1273b spaced equally about its periphery, with every other spacing vane 1273b being staggered axially with respect to adjacent spacing vanes 1273b. Of course, it is also possible that different parts of the integral structure are formed with different materials, thereby to provide additional rigidity where it is needed. It is preferred that the coolant diverter 2260 and core cooling tube 2270 are formed integrally to provide a seamless unitary monolithic structure. This can be via an additive manufacturing process, for example and without limitation.

Figure 12:
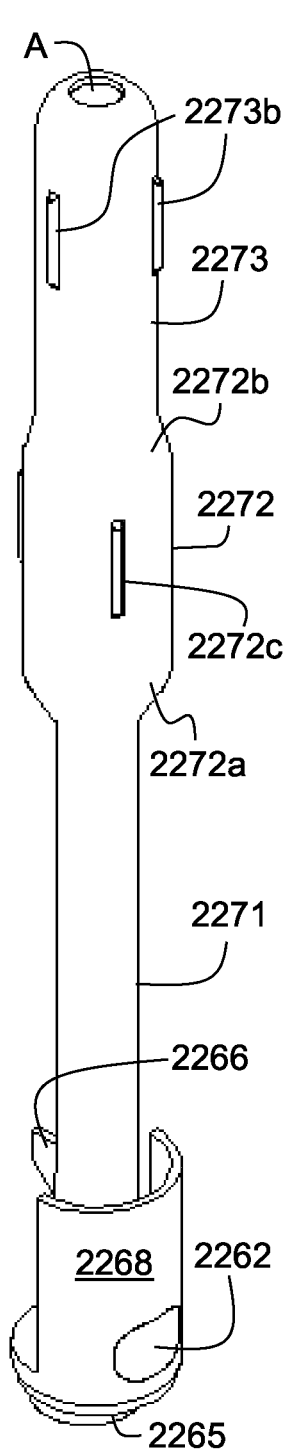
FIG. 12 depicts a further alternative, unitary core cooling tube assembly shown from a first side.
Figure 13:
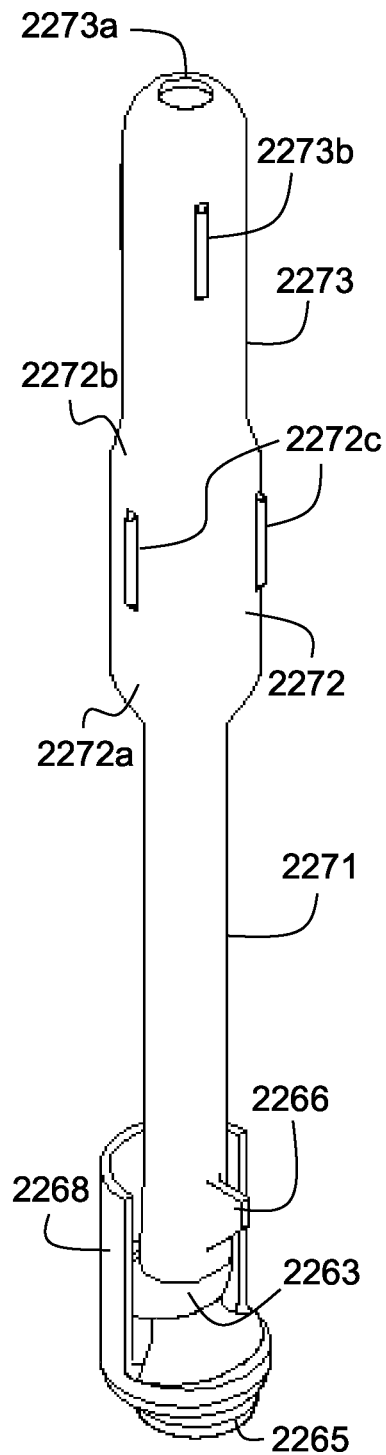
FIG. 13 depicts the core cooling tube assembly of FIG. 12 shown from a second side.
Figure 14:
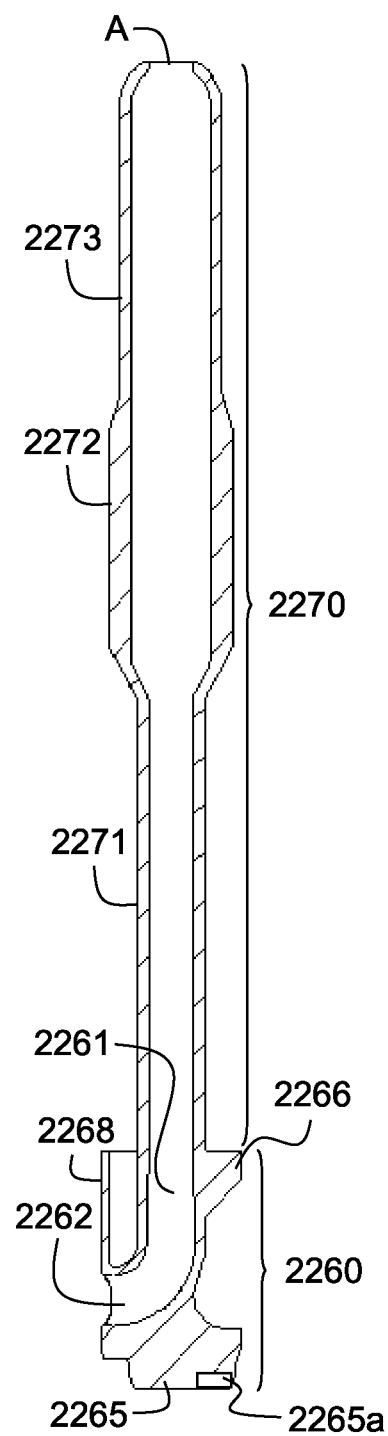
FIG. 14 depicts a section view along a central, axial plane through the core cooling tube assembly of FIGS. 12 and 13.

Turning now to FIGS. 12 to 14, there is shown a further alternative core cooling tube assembly 2260, 2270, which is similar to the core cooling tube assembly 1260, 1270 described immediately above, wherein like features are labelled with like references with the preceding '1' replaced with a preceding '2'. As shown, this core cooling tube 2270 differs in that the third tubular segment 2273 only includes three spacing vanes 2273b, which are aligned axially and distributed evenly about the periphery of the third tubular segment 2273.

In addition, the coolant diverter 2260 includes a part-circumferential wall 2268, with an outer surface akin to the circumferential surface 266 of the core cooling tube 270 according to the first example, but a retaining lip is not shown. This, part-circumferential wall 2268 is spaced from the main body of the coolant diverter 2260, which defines the axial bore 2261, and cooperates with the facing surface of the cooling channel seat 215 of the core plate 210 to provide a substantially sealed connection between the radial bore 2262 and the facing cooling channel 214a. Whilst no retaining lip is shown in FIGS. 12 to 14, the skilled person will appreciate that such a retaining lip may be incorporated in this example.

The coolant diverter 2260 also includes a spacer fin 2266 on the opposite side to the part-circumferential wall 2268. As such, spacer fin 2266 and the part-circumferential wall 2268 together center the coolant diverter 2260 within the cooling channel seat 215 of the core plate 210. In addition, the bottom of the coolant diverter 2260 is provided with a locating spigot 2265 having a notch 2265a in its lower surface. The locating spigot 2265 is received in a locating recess (not shown) in the base of a variation of the cooling channel seat 215 of the core plate 210 shown in FIG. 6. The locating recess (not shown) also includes a projection, which engages the notch 2265a to ensure orientational alignment between the radial bore 2262 and the facing cooling channel 214a. Whilst the notch 2265a does not provide a retaining means in this example, it may be replaced with a radial projection that engages a facing depression in the locating recess (not shown) to provide both a locating means and a retaining means.

The tubular transition portion 2263 is joined to the part-circumferential wall 2268 about the inlet to the radial bore 2262. As such, the coolant diverter 2260 according to this example more rigidly secures the core cooling tube 2270 in the cooling channel seat 215 of the core plate 210 as compared with the coolant diverter 1260 according to the second example, whilst minimizing the reduction in flow area around the tubular transition portion 2263. As such, this arrangement maintains substantially the advantages mentioned above in relation to the coolant diverter 1260 according to the second example, namely reducing the pressure drop as the cooling fluid travels out of the core insert 250 back into the network of cooling channels 214a, 214b.

Figures 15, 16, 17:
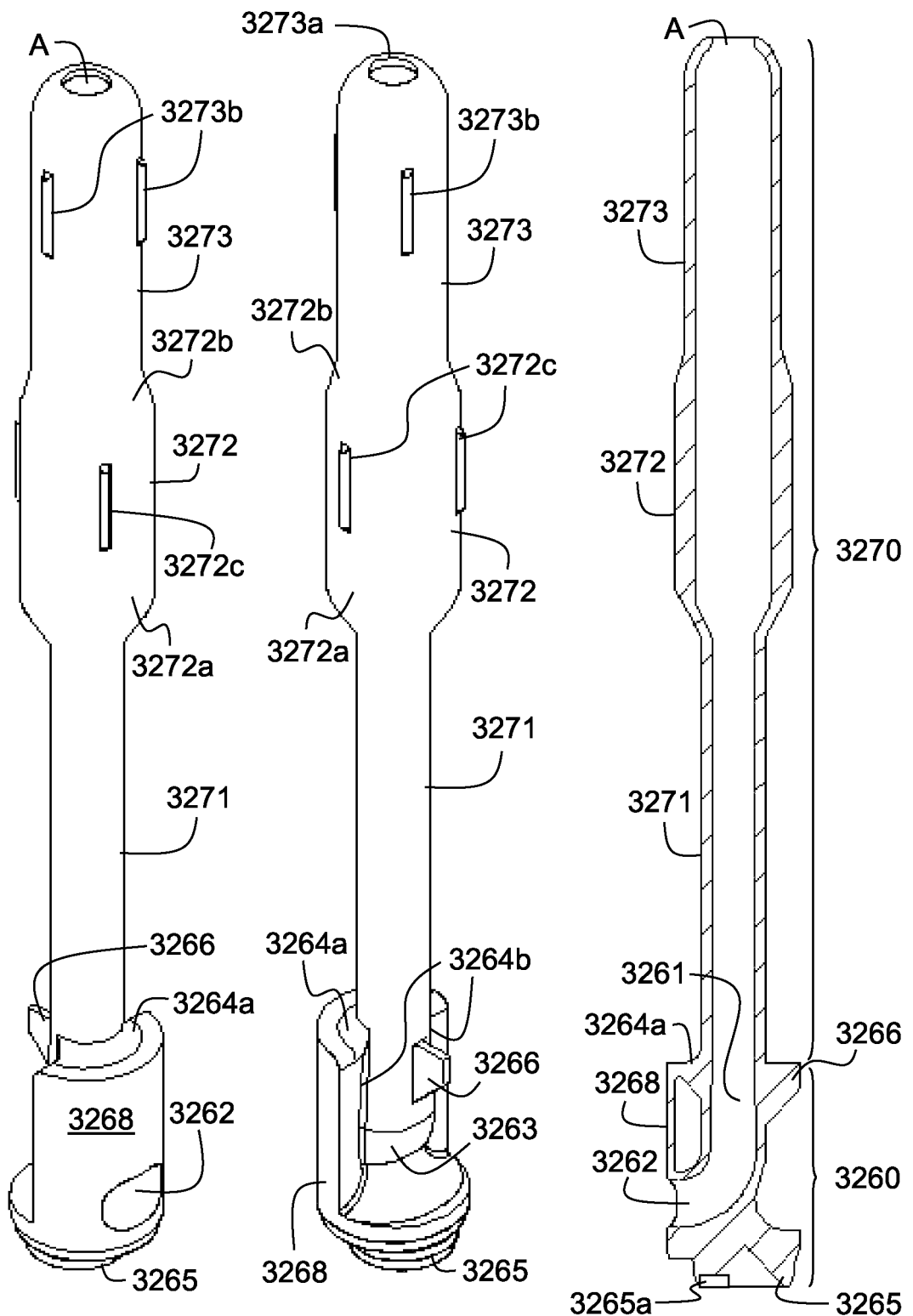
FIG. 15 depicts a yet further alternative, unitary core cooling tube assembly shown from a first side.
FIG. 16 depicts the core cooling tube assembly of FIG. 15 shown from a second side.
FIG. 17 depicts a section view along a central, axial plane through the core cooling tube assembly of FIGS. 15 and 16.

FIGS. 15 to 17 illustrate yet a further alternative core cooling tube assembly 3260, 3270, which is similar to the core cooling tube assembly 2260, 2270 described immediately above, wherein like features are labelled with like references with the preceding '2' replaced with a preceding '3'. As shown, this core cooling tube assembly 3260, 3270 differs only in that the part-circumferential wall 3268 of the coolant diverter 3260 is joined to the main body which defines the axial bore 3261 by webs 3264*a*, 3264*b* about its periphery. More specifically, the upper edge of the part-circumferential wall 3268 is joined to the main body by an annular web 3264*a* and the axial side edges of the part-circumferential wall 3268 are joined to the main body by a respective axial web 3264*b*. This produces a cavity between the part-circumferential wall 3268, the main body and the webs 3264*a*, 3264*b*.

This arrangement improves further the rigidity of the engagement between the core cooling tube 3270 and the cooling channel seat 215 of the core plate 210. However, the resulting reduction in flow area around the tubular transition portion 3263 increases the pressure drop as the cooling fluid travels out of the core insert 250 back into the network of cooling channels 214*a*, 214*b*, as compared to the core cooling tubes 1270, 2270 according to the second and third examples. As with the core cooling tube 2270 according to the third example, a retaining lip may be incorporated in this example.

Figure 18:
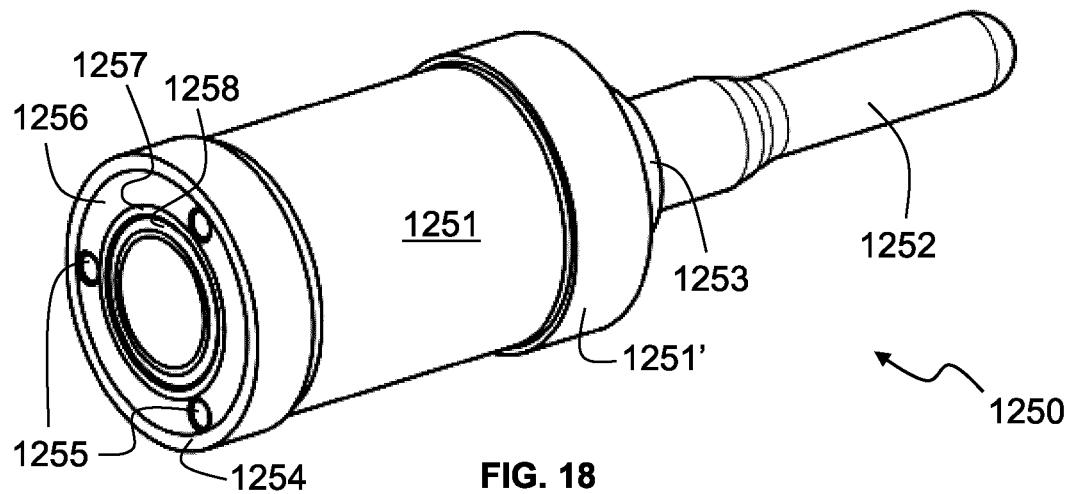
FIG. 18 depicts an alternative, two-part core insert for use in the preform mold assembly of FIGS. 1 and 2.
Figure 19:
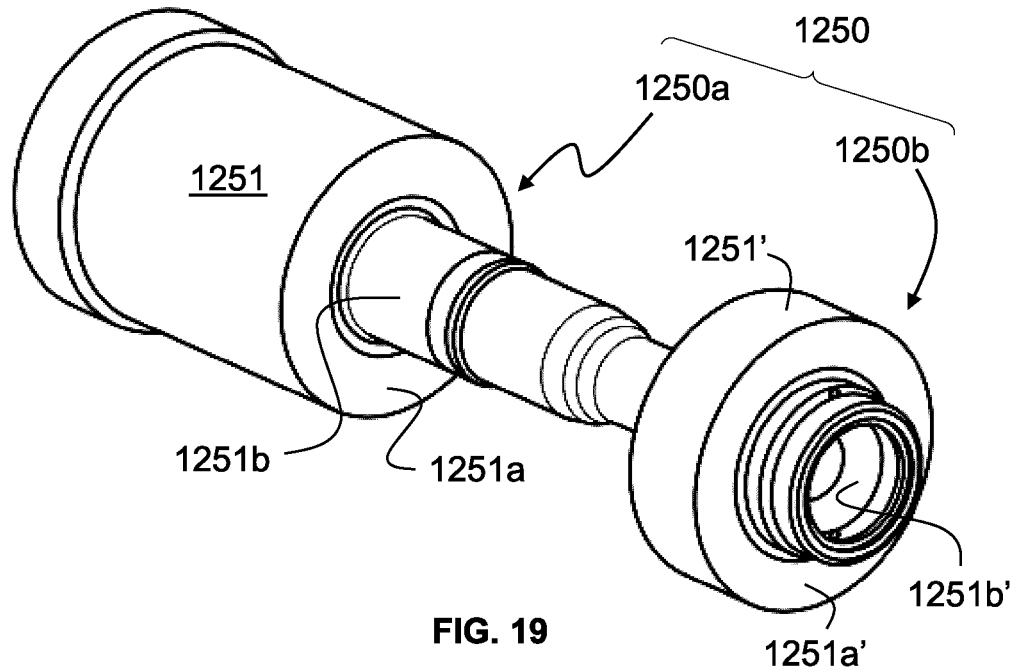
FIG. 19 depicts the two-part core insert of FIG. 18 in an exploded view.
Figure 20:
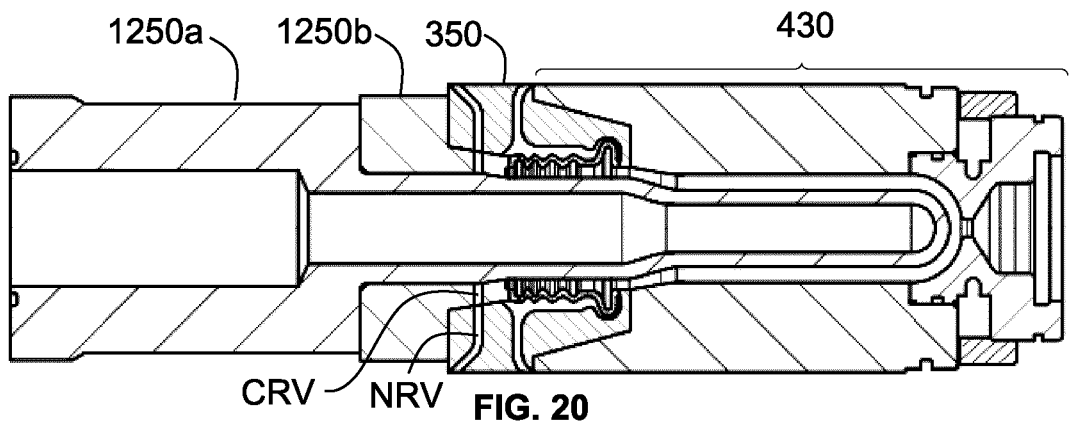
FIG. 20 depicts a section view of a stack assembly incorporating the two-part core insert of FIGS. 18 and 19 along a central, axial plane.

An alternative, two-part core insert 1250 is shown in FIGS. 18 to 20, which can be used in the preform mold assembly 100 in place of the aforementioned core insert 250. The two-part core insert 1250 is similar to the core insert 250 described above, wherein like features are labelled with like references with the addition of a preceding '1'. As shown, this, two-part core insert 1250 differs from the core insert 250 described above in that it includes a primary core insert 1250*a* and a core ring 1250*b*.

In this example, the forwardmost part of the base 1251 of the primary core insert 1250*a* is recessed to provide a front face 1251*a* and an interface portion 1251*b* projecting from the front surface 1251*a*. The core ring 1250*b* includes a base portion 1251' or flange 1251' with a front surface 1251*a*' corresponding to the front surface 251*a* of the core insert 250 described above. The core ring 1250*b* also includes an internal interface surface 1251*b*' and a male taper 1253 corresponding to the male taper 253 of the core insert 250 described above. The interface portion 1251*b* is received by the core ring 1250*b* in contact with the internal interface surface 1251*b*' thereof in a press-fit condition.

As illustrated more clearly in FIG. 20, the provision of a core ring 1250*b* provides a venting path from the inner corner of the neck opening of the preform cavity, between the primary core insert 1250*a* and the core ring 1250*b*. This enables the parting line between the two-part core insert 1250 and split mold inserts 350, or neck rings 350, to be moved from the top sealing surface to the outer corner of the neck opening. The reasons for this and its significance will be immediately apparent to the skilled addressee. In this example, the core ring 1250*b* includes a pair of vent passages CRV extending from the internal interface surface 1251*b*' to a collector groove CG define through the outer surface of the male taper 1253. In operation, air venting through the vent passages is directed by the collector groove CG to which is aligned with a lower vent passages LNRV defined on mating faces of through the neck ring 350. As shown the neck ring 350 further includes upper vent passages UNRV defined on the mating faces thereof.

Figure 21:
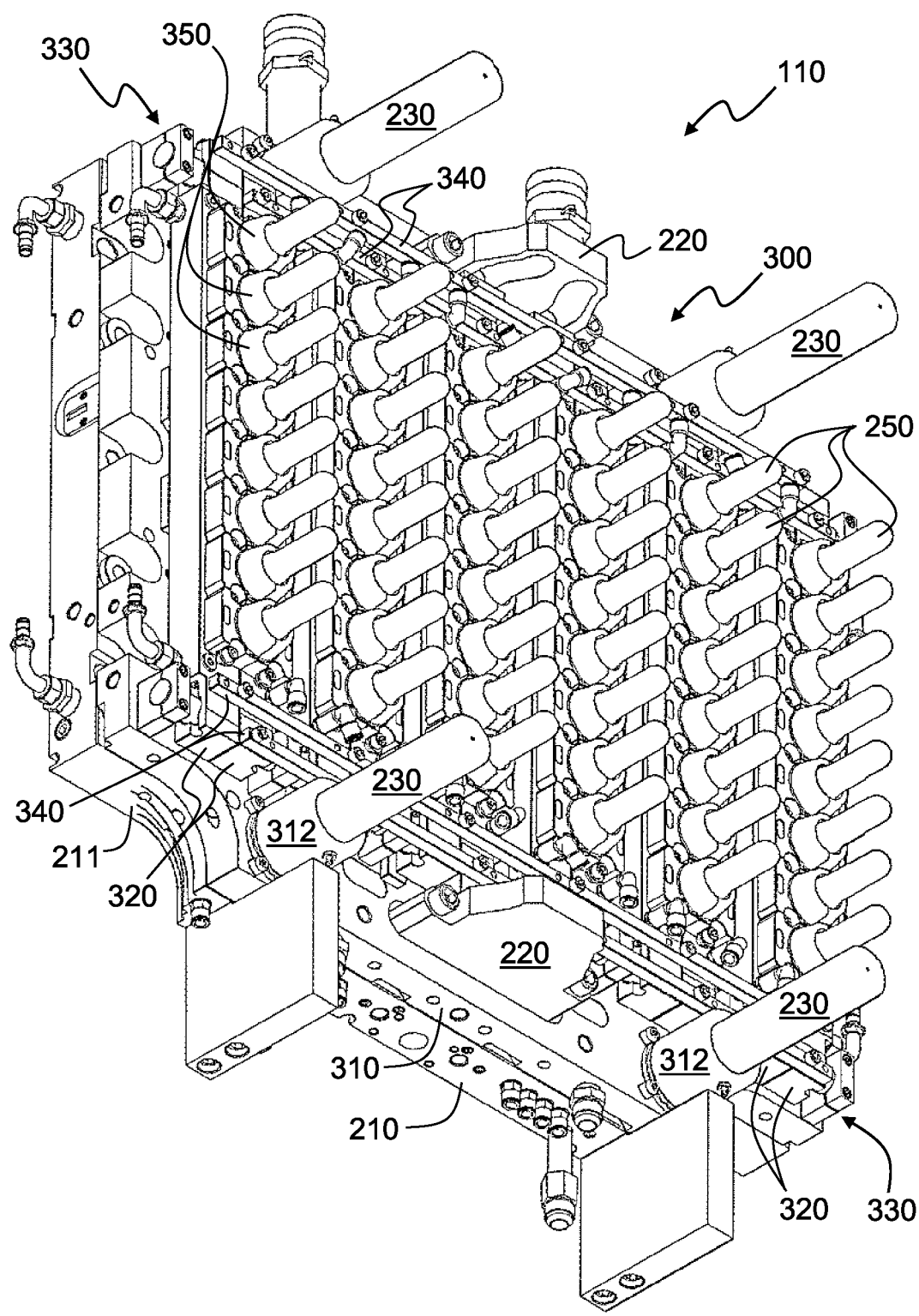
FIG. 21 depicts the moving part of the preform mold assembly of FIGS. 1 and 2, including the core plate assembly and stripper plate assembly.

Turning now to FIG. 21, the moving part 110 of the mold assembly 100 is shown in isolation, with the cavity plate assembly 400 omitted to expose features of the stripper plate assembly 300. The stripper plate assembly 300 includes a stripper plate 310, six slide pairs 320 slidably mounted on the stripper plate 310, upper and lower guide assemblies 330, which guide the movement of the slide pairs 320 along the stripper plate 310 and four connecting bars 340. In this example, the mold stack includes a plurality of split mold inserts 350, or neck rings 350, arranged in pairs and mounted on the slides 320 for movement therewith.

Figure 22:
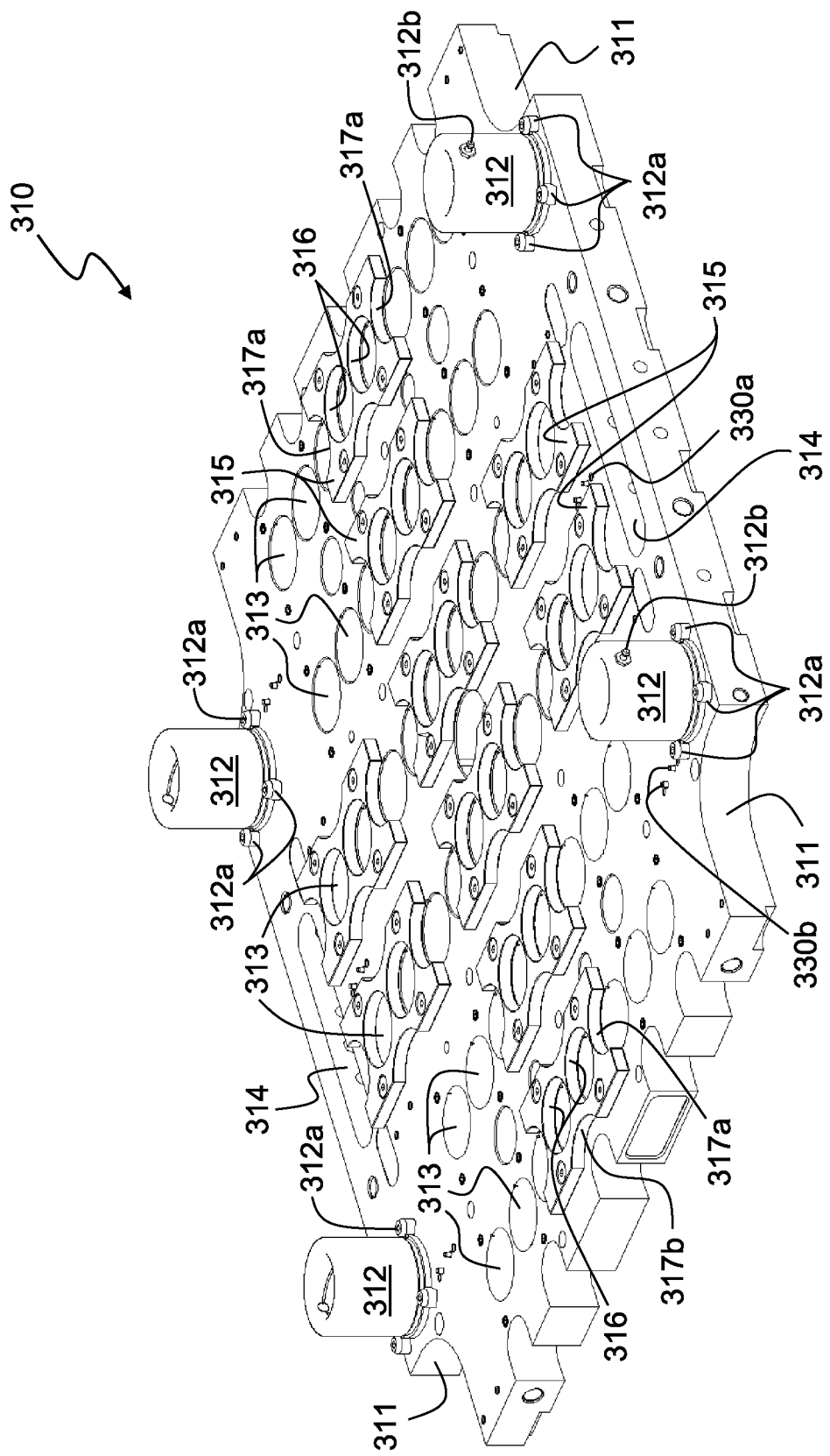
FIG. 22 depicts the stripper plate of the stripper plate assembly of the moving part shown in FIG. 21.

The stripper plate 310, which is shown more clearly in FIG. 22, is substantially rectangular in plan with scalloped corners 311, which are aligned with the scalloped corners 211 of the core plate 210 for accommodating the tiebars (not shown) of an injection molding machine (not shown) within which the mold is mounted. The stripper plate 310 also includes four guide pin bushings 312 with associated holes (not shown) through its thickness, which are horizontally inboard of each scalloped corner 311 for receiving the guide pins 230 of the core plate 210. The stripper plate 310 also includes a plurality of core insert holes 313 through its thickness, upper and lower cam plate holes 314 and ten wear or bearing plates 315, hereinafter bearing plates 315, which provide bearing surfaces along and against which the slides 320 move along the stripper plate 310.

Each guide pin bushing 312 is in the form of a hollow cylinder and is bolted to the stripper plate 310 by four bolts 312*a*. Each guide pin bushing 312 also includes a grease nipple 312*b* for introducing grease onto the inner surface thereof in the usual way. The internal diameter of the guide pin bushings 312 provides a small gap between the guide pins 230 and guide pin bushings 312 within which grease introduced via the grease nipple 312*b* is received, such that the guide pins 230 slide freely within the guide pin bushings 312 to support the stripper plate 310 during movement between it and the core plate 210 in the usual way.

The core insert holes 313 are arranged in an array of six vertical columns and four horizontal rows and each is configured to accommodate the base 251 of one of the core inserts 250. Each core insert hole 313 is sized to provide a clearance between it and the core insert base 251 in order to prevent contact between them as the stripper plate 310 is moved toward and away from the core plate 210 along the guide pins 230. The cam plate holes 314 are obround in shape and configured to accommodate the cam plates 220. Each cam plate hole 314 is sized to provide a clearance between it and the cam plate 220 in order to prevent contact between them as the stripper plate 310 is moved toward and away from the core plate 210 along the guide pins 230. A pair of threaded guide bracket mounting holes 330*a* are included between each column of the core insert holes 313, both at the top and the bottom of the stripper plate 310. A pair of guide bracket dowels 330*b* are also included between each pair of guide bracket mounting holes 330*a*.

The bearing plates 315, which may also be referred to as wear plates 315, are formed of a wear resistant material. Each bearing plate 315 is substantially rectangular in plan and includes two holes 316 through its thickness and four part-circular cut-outs 317*a*, 317*b*. The pitch spacing of the bearing plate holes 316 corresponds to the pitch spacing of the core insert holes 313 along each vertical column. Two of the part-circular cut-outs 317*a* are at the center of the short edges of the bearing plate 315 and the pitch spacing of each part-circular cut-out 317*a* and its adjacent bearing plate hole 316 also corresponds to the pitch spacing of the core insert holes 313 along each vertical column. The other two part-circular cut-outs 317*b* are at the center of the long edges of the bearing plate 315. As such, the bearing plates 315 are symmetrical about a central, longitudinal axis.

The bearing plates 315 are placed lengthwise along one of the vertical columns, with the bearing plate holes 316 and part-circular cut-outs 317*a* aligned with the core insert holes 313. Three bearing plates 315 are mounted along each of the two central columns of core insert holes 313, whilst a single bearing plate 315 is mounted at the vertical center of the four outermost columns. In the mold according to this disclosure, bearing plates 315 are selectively positioned to provide balanced support for the slide pairs 320 during ejection, whilst minimising their number to reduce cost. This is made possible by virtue of the load paths which result from the overall design of the mold assembly 100, which is discussed below.

Figure 23:
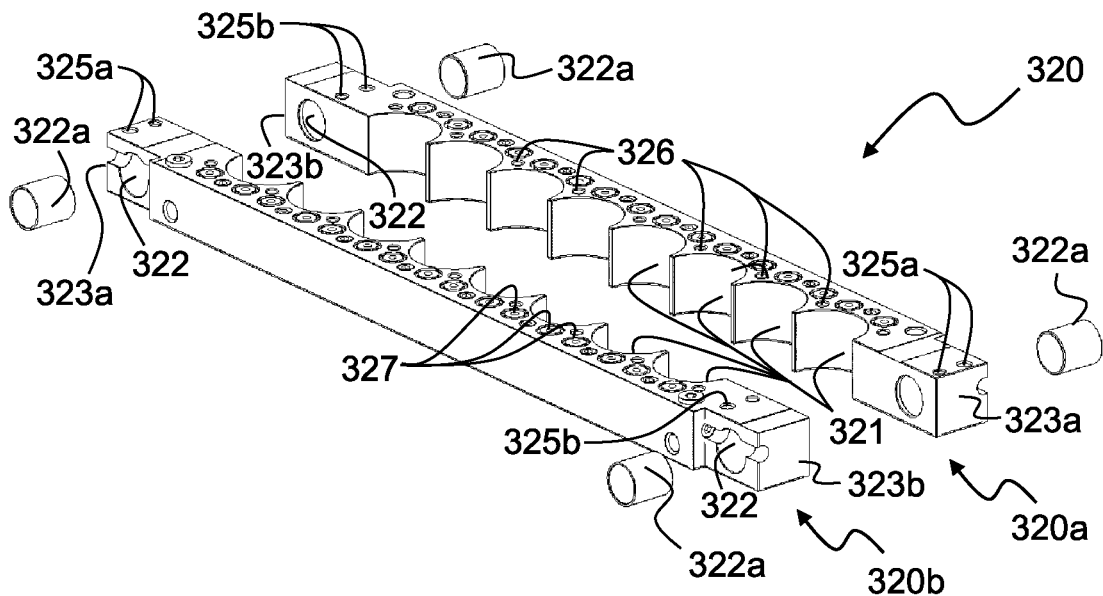
FIG. 23 depicts an exploded view of a pair of slides of the stripper plate assembly of FIG. 18.

Each slide pair 320, shown more clearly in FIG. 23, includes first and second slides 320*a*, 320*b*, which have essentially the same design. Each slide 320*a*, 320*b* is in the form of a bar having a substantially square or near-square cross-section, with a plurality of semi-circular cut-outs 321 along one of its sides and a guide hole 322 at each of its ends 323*a*, 323*b* and extending from one side through to the other side. A guide bushing 322*a* is received in each of the guide holes 322 and is retained therein by an interference fit, although other arrangements are also envisaged. The centermost slides 320*a*, 320*b* also include a cam follower 324 (shown in FIG. 25) at each end 323*a*, 323*b*. Each cam follower 324 is in the form of a roller, which is rotatably mounted to the slide end 323*a*, 323*b* for receipt within one of the cam slots 221 of one of the cam plates 220.

Each slide 320*a*, 320*b* also includes, in its front face, a first pair of connecting bar mounting holes 325*a* at a first end 323*a*, a second pair of connecting bar mounting holes 325*b* adjacent, but spaced from, a second end 323*b*, a series of neck ring mounting hole 326 and a series of cooling channel ports 327. One of the neck ring mounting holes 326 is located between each of the semi-circular cut-outs 321 and a further neck ring mounting hole 326 is located on the outer side of each of the semi-circular cut-outs 321 adjacent the ends 323*a*, 323*b* of the slide 320*a*, 320*b*. In use, the neck rings 350 are mounted to the slides 320*a*, 320*b* by the neck ring mounting holes 326 such that the cooling channel ports 327 are aligned with cooling channel ports (not shown) on a facing surface of the neck rings 350. Each cooling channel port 327 includes an O-ring 327*a* (shown in FIG. 26) for sealing against the neck rings 350. The cooling channel ports 327 are connected to a network of cooling channels (not shown), which are connected to a source of cooling fluid in the usual way.

Figure 24:
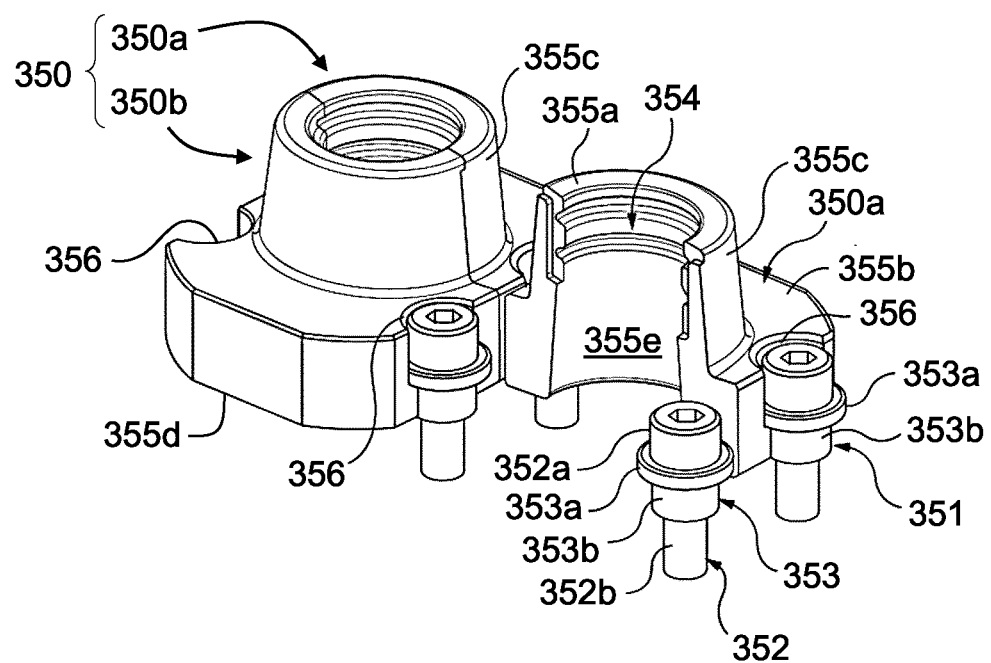
FIG. 24 depicts three neck ring halves and their associated retaining assemblies that secure them to the slides.

In this example, the neck rings 350 are secured to the slides 320*a*, 320*b* in a floating manner by a retainer assembly of the kind described in our co-pending application number PCT/CA2018/050693, which is incorporated herein by reference. More specifically and as shown in FIG. 24, each neck ring 350 is formed of a pair of neck ring halves 350*a*, 350*b*. A plurality of neck ring halves 350*a* are positioned longitudinally adjacent to each other on one slide 320*a* and a corresponding plurality of neck ring halves 350*b* are positioned longitudinally adjacent to each other on an opposed slide 320*b*. Each neck ring half 350*a*, 350*b* is generally configured conventionally, but is configured to be secured to a slide 320*a*, 320*b* with two retainer mechanisms 351.

Each retainer mechanism 351 includes a retainer member in the form of a bolt 352 and an insert member 353. Each bolt 352 has a head portion 352*a* and a threaded shaft portion 352*b*. Each insert member 353 has an upper annular flange portion 353*a*, a cylindrical body portion 353*b* extending axially from the flange portion 353*a* and a cylindrical opening extending axially through the flange portion 353*a* and the body portion 353*b*. The bolt 352 is received within the cylindrical opening of the insert member 353 and threadedly engages the neck ring mounting holes 326 to retain the insert member 353 between the bolt 352 and facing surface of the slide 320*a*, 320*b*. This results in a fixed spacing between the flange portion 353*a* of the insert member 353 and the facing surface of the slide 320*a*, 320*b*.

Each neck ring half 350*a*, 350*b* has a semi-cylindrical central opening 354 such that, when a pair of neck ring halves 350*a*, 350*b* are brought together during operation of an injection molding system, the inward surfaces providing opening 354 of the neck ring halves 350*a*, 350*b* will define the profile for a neck region of a preform to be molded. Each neck ring half 350*a*, 350*b* will be held to a corresponding slide 320*a*, 320*b* by a pair of retainer mechanisms 351 at each longitudinal side of the neck ring half 350*a*, 350*b*. Each neck ring half 350*a*, 350*b* includes an upper, generally arcuate, half-ring portion 355*a* and a flange portion 355*b*. The half-ring portion 355*a* has a tapered side surface 355*c* and the flange portion 355*b* has a lower surface 355*d* and an inner taper surface 355*e*.

Each neck ring half 350*a*, 350*b* also has a pair of longitudinally opposed, generally stepped, semi-cylindrical side apertures 356. Each aperture 356 has a passageway that passes all the way through the flange portion 355*b* of the neck ring half 350*a*, 350*b*. When a pair of neck ring halves 350*a*, 350*b* are positioned longitudinally adjacent to each other on a slide 320*a*, 320*b*, a cylindrical opening is formed by the two adjacent, facing apertures 356. This opening is configured to receive one of the retainer mechanism 351 and includes a recessed platform described by the step in the facing apertures 356. The depth of this, recessed platform is specifically provided to position the flange portion of 353*a* of the insert member 353 such that a gap is formed between the lower surface of the flange portion 353*a* and the upward facing opposite surface of the recessed platform. This gap may be in the range of 0.01 to 0.03 mm, by way of example.

When the neck ring halves 350*a*, 350*b* are mounted to the slides, the pressure exerted on the flange portions 355*b* by the O-rings 327*a* urges them away from the slide 320*a*, 320*b*. The aforementioned gap between the lower surface of the flange portion 353*a* and the upward facing opposite surface of the recessed platform formed by the stepped side apertures 356 allows a slight (e.g. 0.01 to 0.03 mm) gap to form between the neck ring halves 350*a*, 350*b* and the front face of the slides 320*a*, 320*b*. This gap enables a degree of sliding, or floating, of the neck ring halves 350*a*, 350*b* relative to the slides 320*a*, 320*b*, whilst exerting sufficient compression of the O-rings 327*a* to maintain the sealed interface between the cooling channel ports 327 and the facing cooling channel ports (not shown) of the neck ring halves 350*a*, 350*b*.

As such, the neck ring halves 350*a*, 350*b* are capable of a degree of sliding movement relative to their respective slides 320*a*, 320*b* as the mold halves are brought together. This allows the pairs of neck ring halves 350*a*, 350*b* to be repositioned, thereby assisting in proper alignment with the rest of the mold stack. However, it is also envisaged that traditional, non-floating neck rings (not shown) may be used, which is described in more detail below.

Figure 25:
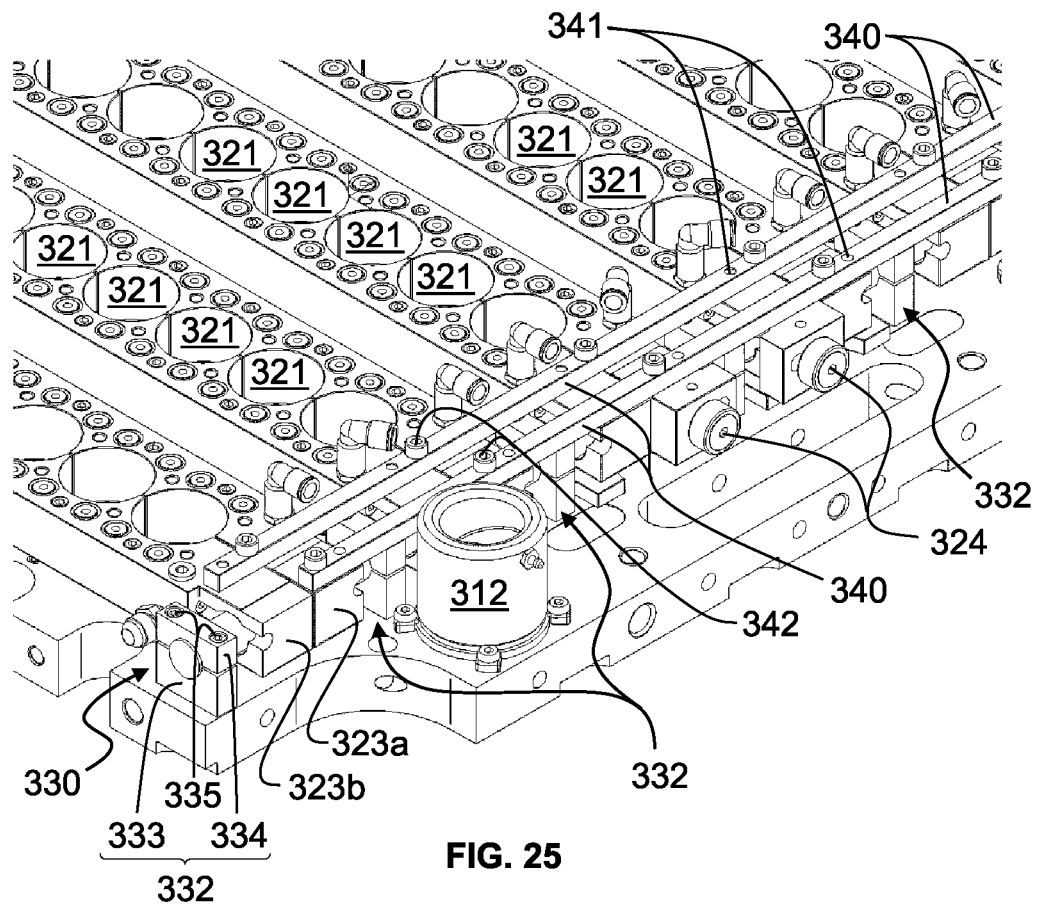
FIG. 25 depicts an enlarged view of part of the stripper plate assembly of the moving half of FIG. 21 with the neck ring pairs omitted to expose the slides.
Figure 26:
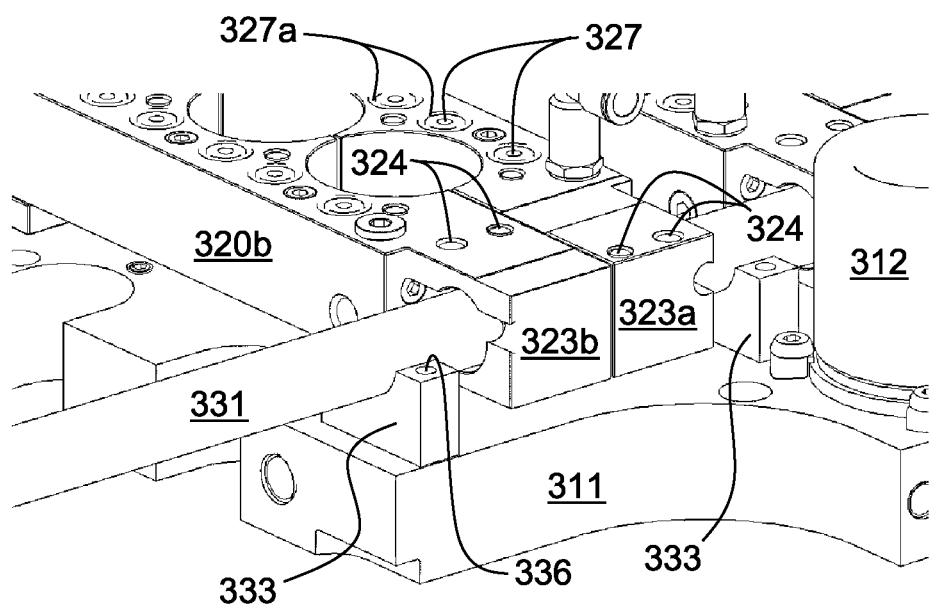
FIG. 26 depicts an enlarged view of FIG. 25 with the connecting bars omitted and illustrating the insertion of the guide shaft.

FIGS. 25 and 26 illustrates the interconnection between the slide pairs 320 and the stripper plate 310, including one of the guide assemblies 330 and one pair of connecting bars 340. The guide assembly 330 includes a guide shaft 331 having a round cross-section and secured to the stripper plate 310 by seven guide brackets 332. The upper guide assembly 330 is mounted across an upper region of the stripper plate 310, immediately below the upper scalloped corners 311 and guide pin bushings 312. The lower guide assembly 330 is similarly mounted across a lower region of the stripper plate 310, immediately above the lower scalloped corners 311 and guide pin bushings 312.

Each of the upper and lower guide assemblies 330 includes a guide bracket 332 mounted between each slide pair 320 and end guide brackets 332 mounted adjacent each scalloped corner 311. The guide brackets 332 fix the guide shaft 331 in place. Each guide bracket 332 includes a base 333, a clamp member 334 and a pair of bolts 335 received within respective bolt holes 336 in each of the base 333 and clamp member 334. As illustrated in FIG. 26, each guide assembly 330 is assembled by inserting the guide shaft 331 through the guide bushings 322a at one end 323a, 323b of the slides 320a, 320b with the guide bracket base 333 held in place by the guide bracket dowels 330b. The guide bracket clamp members 334 are then placed over the guide shaft 331 and the bolts 335 are inserted into the bolt holes 336 in each of the guide bracket base 333 and clamp member 334. The bolts 335 are threadedly engaged with the guide bracket mounting holes 330a to secure the guide bracket clamp member 334 to the stripper plate 310 and to clamp the guide shaft 331 between the guide bracket clamp member 334 and base 333. As a result, the slides 320a, 320b are retained against the bearing plates 315 of the stripper plate 310, such that they are slidable along the guide shafts 331 and bearing plates 315.

The connecting bars 340 in this example are elongate with a square cross-section and each has six pairs of bolt holes 341 spaced along its length. Bolts 342 are received in each bolt hole 341 and secure the connecting bars 340 to one of the slides 320a, 320b of each slide pair 320, although only one bolt 342 is illustrated in each pair of bolt holes 341 in FIG. 25. One of the connecting bars 340 is connected to the first slide 320a of each slide pair 320 and the other of the connecting bars 340 is connected to the second side 320b of each slide pair 320. As such, sliding movement of one of the first slides 320a causes all of the first slides 320a to move therewith. Similarly, sliding movement of one of the second slides 320b causes all of the second slides 320b to move therewith.

In use, forward movement of the stripper plate 310 away from the core plate 210 causes the cam followers 324 to move along the cam slots 221, which causes the slides 320a, 320b carrying the cam followers 324 to slide along the guide shafts 331 and bearing plates 315 toward one another. This, in turn, causes each of the slide pairs 320 to move away from one another, sliding along the guide shafts 331 and bearing plates 315, to open the neck rings and in so doing eject preforms from the cores in the usual way. Similarly, rearward movement of the stripper plate 310 towards the core plate 210 causes the cam followers 324 to follow a reverse path along the cam slots 221, thereby closing the neck rings.

Figure 27:
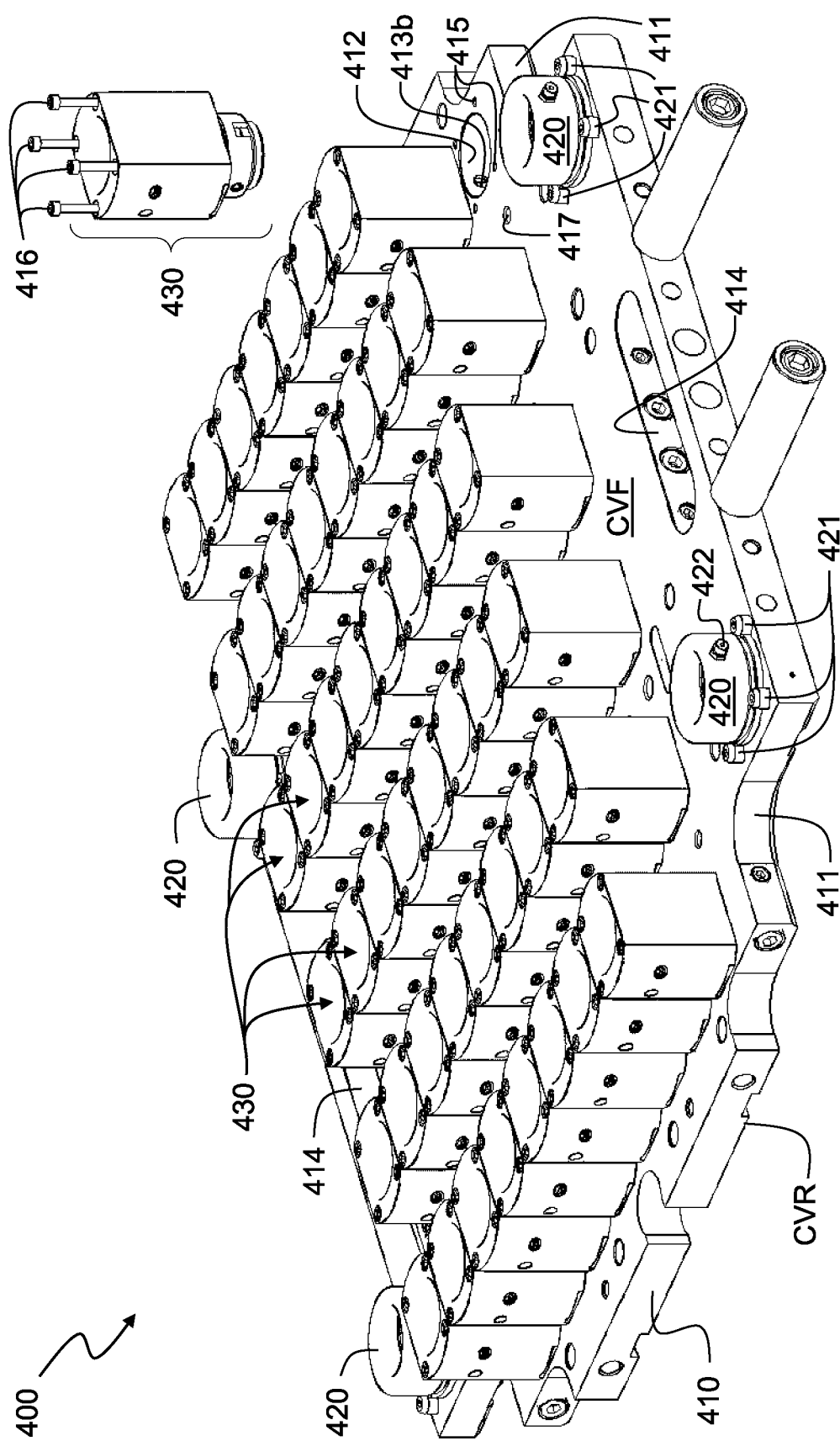
FIG. 27 depicts the cavity plate assembly of the preform mold assembly of FIGS. 1 and 2 with one of the cavity assemblies removed therefrom.

Turning now to FIG. 27, the cavity plate assembly 400 includes a cavity plate 410, four guide pin bushings 420 and a plurality of cavity assemblies 430. The cavity plate 410 is substantially rectangular in plan with a front face CVF, a rear face CVR and scalloped corners 411. The scalloped corners 411 are aligned with the scalloped corners 211, 311 of the core and stripper plates 210, 310, when the mold 100 is in an assembled condition, for accommodating the tiebars (not shown) of an injection molding machine (not shown) within which the mold is mounted. The cavity plate 410 includes guide pin holes (not shown) through its thickness, which are aligned with the guide pin bushings 420 and are horizontally inboard of each scalloped corner 411 for receiving the guide pins 230 of the core plate 210.

The cavity plate 410 also includes a plurality of seats 412 through its thickness, a network of cooling channels 413a, 413b, 413c in communication with the seats 412 and upper and lower cam plate holes 414 through its thickness. The seats 412 are arranged in an array of six vertical columns and eight horizontal rows, arranged to match the core inserts 250. Each seat 412 is surrounded by four threaded cavity mounting holes 415, wherein one of the cavity inserts 430 is received in each seat 412 and is secured to the cavity plate 410 by bolts 416, which threadedly engage the cavity mounting holes 415. The cam plate holes 414 are obround in shape and configured to accommodate the cam plates 220. Each cam plate hole 414 is sized to provide a clearance between it and the cam plate 220 in order to prevent contact between them as the mold 100 closes. The cavity plate 410 also includes an array of coupling bolt holes 417 for receiving the aforementioned coupling bolts 217 to secure the cavity plate 410 to the core plate 210, which is described further below.

Each guide pin bushing 420 is in the form of a hollow cylinder and is bolted to the cavity plate 410 by four bolts 421. Each guide pin bushing 420 also includes a grease nipple 422 for introducing grease onto the inner surface thereof in the usual way. The internal diameter of the guide pin bushings 420 provides a small gap between the guide pins 230 and guide pin bushings 420 within which grease introduced via the grease nipple 422 is received, such that the guide pins 230 slide freely within the guide pin bushings 420 to ensure proper alignment between the core and cavity plates 210, 410 during operation in the usual way.

As illustrated more clearly in FIGS. 28 to 35, each cavity assembly 430 includes a cavity insert 440, a gate insert 450 and a pair of retaining pins 460. In this example, the cavity insert 440 and gate insert 450 are separate components, but in other variations they may be formed as a single unitary structure. The cavity insert 440 includes a substantially cylindrical body 441 with flat sides 442 to provide a substantially obround cross-section. The cavity insert 440 also includes a spigot 443 projecting from a mounting face 441a at one end of the body 441, four axial mounting holes 444 adjacent the outer corners of the substantially obround cross-section, which extend from the mounting face 441a to a front face 441b at the opposite end of the body 441, and a network of cooling channels 445.

The spigot 443 is hollow, with a stepped gate insert seat 446 for receiving the gate insert 450. The body 441 of the cavity insert 440 is also hollow and includes a female taper 447 extending from the front face 441b to a molding surface 448. The body 441 includes an annular step 447a joining the taper 447 to the molding surface 448, which extends therefrom to the gate insert seat 446. The gate insert seat 446 includes a first portion 446a, cylindrical, which extends from an end face 443a of the spigot 443 to a first internal shoulder 443b, and a second portion 446b, also cylindrical, having a smaller diameter than the first portion 446a, which extends from the first internal shoulder 443b to a second internal shoulder 443c. The first internal shoulder 443b provides a transition from the first portion 446a of the gate insert seat 446 to its second portion 446b, while the second shoulder 443c provides a transition from the second portion 446b of the gate insert seat 446 to the molding surface 448 of the body 441.

The spigot 443 includes a pair of threaded, radial holes 449 extending from the first portion 446a of the gate insert seat 446 to an outer circumferential surface of the spigot 443. The axis of the radial holes 449 is parallel to the flat sides 442 and their bases are substantially flush with the first internal shoulder 443b of the gate insert seat 446. The spigot 443 also includes a circumferential groove 443d in its outer, circumferential surface, below the radial holes 449, for accommodating an O-ring seal (not shown).

Figure 30:
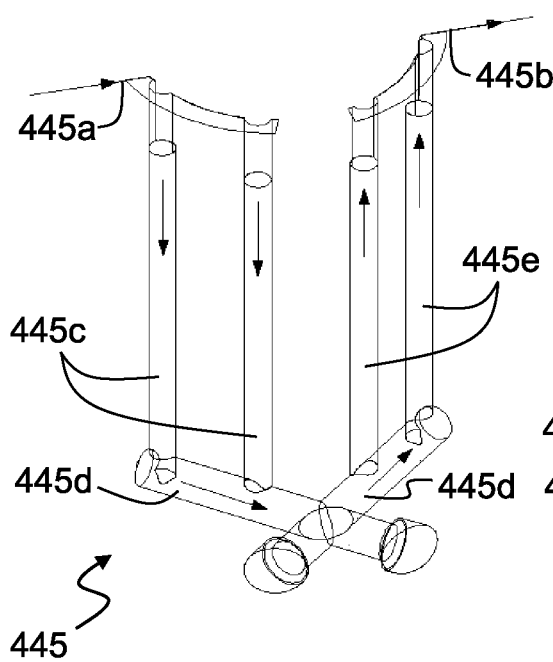
FIG. 30 illustrates the cooling channels in segment A-A of the cavity insert of FIG. 29.

The network of cooling channels 445 includes a coolant inlet 445a and a coolant outlet 445b each fluidly connected to two distinct circuits. One of the circuits is illustrated in the schematic of FIG. 30, which corresponds to the half of the cavity insert 440 delineated by line A-A in FIG. 29. The other circuit (not shown in FIG. 30) mirrors the one shown in FIG. 30 and the coolant inlet 445a and outlet 445b are both fluidly connected to both circuits. Each circuit includes a pair of first axial channels 445c, a pair of transverse or cross channels 445d and a pair of second axial channels 445e. The coolant inlet 445a is described by an axial slot 445a through the spigot 443, which extends from its end face 443a to the first internal shoulder 443b. The coolant outlet 445b is also described by an axial slot 445b through the spigot 443, similar to that of the coolant inlet 445a, but is on the opposite side thereof. The coolant inlet 445a, coolant outlet 445b and radial holes 449 are spaced equally about the periphery of the spigot 443, such that the radial holes 449 are between the coolant inlet 445a and the coolant outlet 445b. The flow path through each of the coolant inlet 445a and the coolant outlet 445b is orthogonal to the axis of the radial holes 449.

The axial channels 445c, 445e are provided by blind drillings, which are spaced equally about the spigot 443 and body 441 and which extend from the end face 443a of the spigot 443 to the cross channels 445d. As illustrated most clearly in FIG. 29, the diameter of the first portion 446a of the gate insert seat 446 is such that the portion of each of these drillings that extends from the end face 443a to the first internal shoulder 443b, opens into the first portion 446a. The cross channels 445d of each circuit are also provided by blind drillings that extend from a circumferential surface 441c of the cylindrical body 441 toward respective ones of the flat sides 442, such that they extend orthogonal to one another. The cross channels 445d intersect each other and a respective pair of the axial channels 445c, 445e to provide fluid communication between the first axial channels 445c and the second axial channels 445e.

Figure 31:
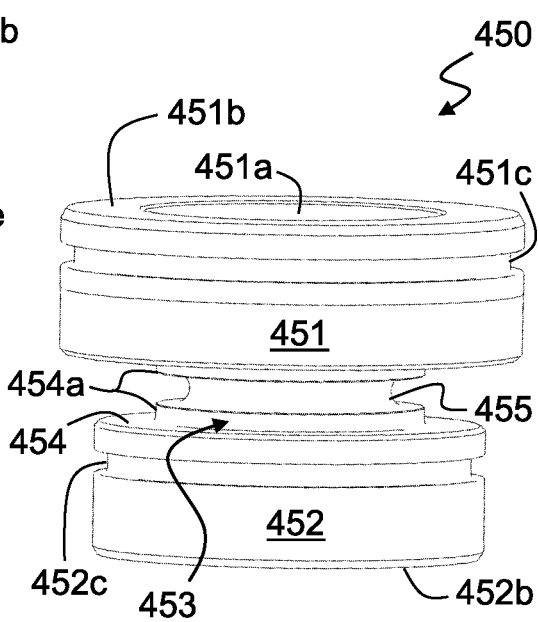
FIG. 31 depicts the gate insert of the cavity assembly of FIG. 28.

Referring now to FIGS. 31 to 33, the gate insert 450 is substantially cylindrical in shape with a first, nozzle tip receiving portion 451, a second, molding cavity portion 452 and a third, gate portion 453 joining the first portion 451 to the second portion 452. The first portion 451 includes a recess 451a extending from an end face 451b thereof, which is shaped to accommodate the tip of a valve-gated injection nozzle (not shown) and associated tip insulator (not shown) in the usual way. The first portion 451 also includes a circumferential groove 451c in its outer, circumferential surface and spaced from the end face 451b for accommodating an O-ring seal (not shown).

The second portion 452 describes a dome-shaped molding surface 452a extending from an end face 452b thereof, which is shaped to describe the outer surface of the base of a preform to be molded in the usual way. The second portion 452 also includes a circumferential groove 452c in its outer, circumferential surface and spaced from the end face 452b for accommodating an O-ring seal (not shown). The third portion 453 describes a central, cylindrical gate 453a, which joins the recess 451a of the first portion 451 to the molding surface 452a of the second portion 452 in the usual way.

The diameter of the second portion 452 is smaller than that of the first portion 451 and the diameter of the third portion 453 is smaller than that of both the first and second portions 451, 452. The third portion 453 therefore provides a necked transition between the first and second portions 451, 452, thereby providing a circumferential cooling groove 454 therebetween. In addition, the third portion 453 also includes a circumferential bypass groove 455 recessed in the cooling groove 454. In this example, the bypass groove 455 is narrower than the cooling groove 454, such that a pair of shoulders 454a are described in the base of the cooling groove 454. As such, the cooling groove 454 provides a primary groove 454 and the bypass groove 455 provides a secondary groove 455 in the base of the primary groove 454.

Referring now to FIG. 32, each retaining pin 460 includes a cylindrical body 461 with an externally threaded portion 462 and a plug portion 463. The threaded portion 462 includes a driving end 464 with a hexagonal recess 465 configured to receive a driving tool, for example a hex key (not shown). The plug portion 463 extends from the threaded portion 462 and includes a smooth circumferential surface 466 and a flat end 467.

With reference to FIGS. 33 and 34, the network of cooling channels 413a, 413b, 413c of the cavity plate 410 include a feed channel 413a, which extends across the cavity plate 410 and parallel to the rows of seats 412, and a series of branch channels 413b, 413c, which extend between each column of seats 412, thereby joining the seats 412 in each column together in series. In FIG. 33, the branch cooling channel segment 413b to the left of each seat 412 provides an inlet 413b to the seat 412, while the branch cooling channel segment 413c to the right of each seat 412 provides an outlet 413c or vice versa. In this example, the inlet 413b and outlet 413c are aligned at the same depth in the cavity plate 410 and are also in opposing sides thereof. It is also envisaged that the inlet 413b and outlet 413c may extend at an angle, e.g. a right angle, relative to each other.

The feed channel 413a has a first diameter $D_1$ and the inlet 413b and outlet 413c have a second diameter $D_2$, which is smaller than the first diameter $D_1$. Each seat 412 of the cavity plate 410 comprises a stepped bore with a first, cavity insert receiving portion 412a, a second, gate insert receiving portion 412b with a smaller diameter than the first portion 412a and a step 412c providing a transition therebetween. The cavity plate 410 has a depth D, or thickness, as described from the front face CVF to the rear face CVR, which is substantially thinner than a conventional cavity plate (not shown).

The bodies of conventional cavity inserts (not shown) are received almost entirely within bores in such conventional cavity plates (not shown) such that most or all of their molding surfaces are within the plate, with cooling channels formed about the outer surface of each body which define pathways with the holes along which the cooling fluid flows. Contradistinctively, the cavity plate 410 of the mold 100 only receives the spigot 443, such that the same cavity plate 410 may be used with different cavity inserts 440 for molding different preform designs. This also enables the cavity plate 410 thickness to be minimized. In this example, the first diameter $D_1$ is approximately half of the depth D and the second diameter $D_2$ is approximately one third of the depth D. This has been found to provide a cavity plate 410 having sufficient rigidity in operation, whilst minimizing the depth D. It is envisaged that, in some applications, the size of some of the cooling channels 413a, 413b, 413c can be up to 75% of the depth D of the cavity plate 410 without detriment to its rigidity. However, it is preferred that the size $D_1$, $D_2$ of the cooling channels 413a, 413b, 413c is at most 60% of the depth D of the cavity plate 410. It is also preferred that the size $D_1$, $D_2$ of the inlet 413b and outlet 413c is at least 15%, more preferably at least 25%, of the depth D of the cavity plate 410. It should also be noted that the cooling channels 413a, 413b, 413c need not have a round cross-section, in which case the aforementioned sizes $D_1$, $D_2$ may represent the dimension of the cooling channels across the thickness of the cavity plate 410.

In addition, the molding surface 448 of the cavity insert 440 in this example is located entirely between the female taper 447 of the cavity insert 440 and the mounting face 441a of the body 441. However, the foregoing is not essential in every case as the location of this split-line may be affected by a depth of gate insert seat 446, length of the spigot 443, thickness of the cavity plate 410 as well as a shape and size of the base molding portion defined in the gate insert 450. Suffice it to state that part of the molding surface 448 could be received within the cavity plate seat 412. It is envisaged that up to one third, but preferably 10% or less, of the molding surface 448 could be received within the cavity plate seat 412.

Figure 28:
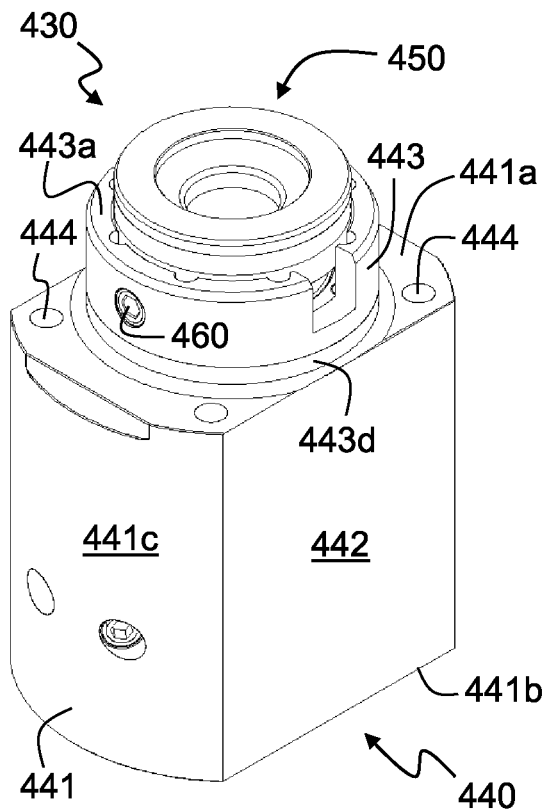
FIG. 28 depicts one of the cavity assemblies of the cavity plate assembly of FIG. 27.
Figure 29:
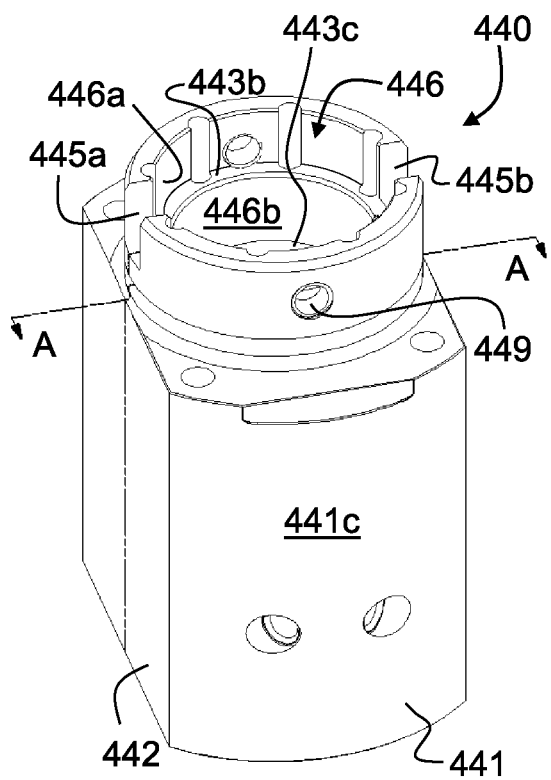
FIG. 29 depicts the cavity insert of the cavity assembly of FIG. 28 with the gate insert omitted.

As illustrated in FIGS. 28 and 33, the gate insert 450 is received within the stepped gate insert seat 446 of the cavity insert 440. More specifically, the molding cavity portion 452 of the gate insert 450 is received within the second portion 446b of the gate insert seat 446, with an O-ring (not shown) received within the circumferential groove 452c providing a seal therebetween. The end face 452b of the molding cavity portion 452 abuts the second shoulder 443c, such that the dome-shaped molding surface 452a provides an extension of the molding surface 448 of the cavity insert 440. The lower part of the nozzle tip receiving portion 451 is received within an upper part of the first portion 446a of the gate insert seat 446, with the circumferential cooling groove 454 aligned with the lower part of the first portion 446a of the gate insert seat 446 and with the base of the coolant inlet 445a and coolant outlet 445b. A cooling channel 454b is described between the circumferential cooling groove 454 and the facing surface of the lower part of the first portion 446a of the gate insert seat 446.

As illustrated in FIGS. 28, 34 and 35, each retaining pin 460 is received within one of the radial holes 449 of the spigot 443 of the cavity insert 440. The threaded portion 462 threadedly engages the threads of the radial hole 449 and the plug portion 463 extends inwardly of the spigot 443, into the circumferential cooling groove 454 and abuts the shoulders 454a. As such, the cooling channel 454b described between the circumferential cooling groove 454 and the first portion 446a of the gate insert seat 446 is divided into two segments or halves, wherein the plug portions 463 of the retaining pins 460 act as diverters. As illustrated more clearly in FIG. 35, the bypass groove 455 describes with the flat end 467 of the plug portion 463 a bypass flow channel segment 455a, which allows some flow to pass between the two halves of the cooling channel 454b. In addition to the aforementioned segmentation of the cooling channel 454b, the retaining pin 460 also retains the gate insert 450 within the spigot 443 of the cavity insert 440 to maintain the cavity assembly 430 in an assembled condition.

The cavity assemblies 430 are mounted to the cavity plate 410 by inserting the spigot 443 and projecting portion of the gate insert 450 of each cavity assembly 430 into one of the cavity plate seats 412. More specifically, the spigot 443 of each cavity insert 440 is received within the first, cavity insert receiving portion 412a and the upper part of the nozzle tip receiving portion 451 is received in the second, gate insert receiving portion 412b. O-rings (not shown) are received within the circumferential grooves 451c, 443d to providing sealed connection with the cavity insert seats 412 on either side of the inlets 413b and outlets 413c. Whilst not shown explicitly in the drawings, the end face 451b of the nozzle tip receiving portion 451 of the gate insert 450 is recessed slightly with respect to the rear face CVR of the cavity plate 410.

The cavity inserts 440 are oriented such that the flat sides 442 of the bodies 441 face one another along the vertical columns, as illustrated in FIGS. 27 and 33. In this orientation, the coolant inlets 445a and outlets 445b in the spigot 443 are aligned with the inlets 413b and outlets 413c in the cavity plate 410. The bolts 416 are inserted into the mounting holes 444 of the body 441 of each cavity insert 440 and threadedly engaged with the cavity mounting holes 415 to secure the cavity inserts 440 to the cavity plate 410. Torqueing the bolts 416 forces the mounting face 441a of the body 441 against the front face CVF of the cavity plate 410. Torqueing the bolts 416 also forces the end face 443a of each spigot 443 against the step 412c of the cavity plate seat 412, thereby closing off the upper end of the inlet 445a and outlet 445b and the drillings forming the axial channels 445c, 445e. As a result, the network of cooling channels 445 of each cavity insert 440 is sealingly connected to the network of cooling channels 413a, 413b, 413c of the cavity plate 410.

In use, cooling fluid flows from the feed channel 413a through the inlet 413b of the seat 412 into the inlet 445a of a first cavity assembly 430 in each vertical column. Most of the cooling fluid flows from the inlet 445a into the first axial channels 445c of each cooling circuit, through cross channels 445d, into the second axial channels 445e and out of the outlet 445b and into the outlet 413c of the seat 412. However, some of the cooling fluid also flows through the bypass channel segments 455a, which provides a more balanced flow through the cavity assembly 430 and simultaneously cools the region of the gate insert 450 surrounding the gate 453a. The cooling fluid then passes into the inlet 413b of the next seat 412 in the column and through the cavity assembly 430 received therein. It should be noted, however, that this is only one possible implementation. Other configurations of cooling channels 413a, 413b, 413c, 445 are envisaged without departing from the scope of this disclosure.

Indeed, it is expressly envisaged that the configuration of the bypass channel segments 455a may be varied, for example by one or more modifications to the bypass groove 455 or retaining pin 460. FIG. 36 illustrates one such variation in which each bypass channel segment 1455a lies adjacent the molding cavity portion 452 of the gate insert 450, such that only one shoulder 1454a is provided. The retaining pin 460 in the arrangement of FIG. 36 corresponds to that of FIG. 35. FIG. 37 illustrates another variation in which the bypass channel segments 455a, 1455a are omitted and the retaining pin 2460 includes a plug portion 2463 having a tapered end 2467. The tapered end 2467 cooperates with the circumferential cooling groove 454 to provide bifurcated bypass channel segments 2455a. Other arrangements are also envisaged and will be appreciated by those skilled in the art. For example, the cutaway provided by the tapered end 2467 may be replaced by a hole through the pin or some other arrangement.

Figure 39:
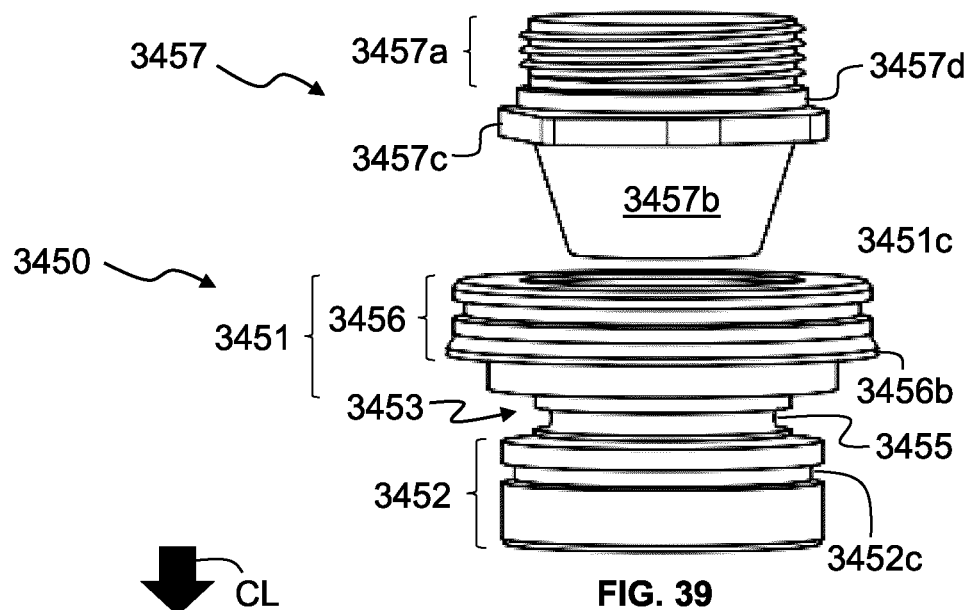
FIG. 39 depicts an exploded view of the gate pad and gate insert of FIG. 38.

FIGS. 38 and 39 illustrate an alternative cavity plate assembly 3400, which is similar to the cavity plate assembly 400 described above, wherein like features are labelled with like references with the addition of a preceding '3'. As shown, this cavity plate assembly 3400 differs, inter alia, in that the gate insert 450 is replaced with a two-part assembly, which includes a gate insert 3450 and a gate pad 3457. Each seat 3412 of the cavity plate 3410 includes a first, cavity insert receiving portion 3412a, a second, gate insert receiving portion 3412b with a slightly smaller diameter than the first portion 3412a and a tapered transition 3412c therebetween.

The gate insert 3450 includes a gate pad receiving portion 3451 in place of the first, nozzle tip receiving portion 451, which is longer and stepped to provide an enlarged end portion 3456 that abuts the end face 3443a of the spigot 3443 instead of the step 412c of the cavity plate seat 412 in the previous example. The gate pad receiving portion 3451 includes a frustoconical recess 3456a for receiving the gate pad 3457, which is tapered at an included angle of between 30 and 40 degrees, approximately 35 degrees in this example. The gate 3453a joins the receiving portion 3451 with the dome-shaped molding surface 3452a. The enlarged end portion 3456 also includes a lip 3456b adjacent the step, which lies adjacent the tapered transition 3412c of the seat 3412 of the cavity plate 3410 in an assembled condition. The circumferential groove 3451c is also on the outer, circumferential surface of the enlarged end portion 3456 for accommodating an O-ring seal (not shown).

The gate pad 3457 is hollow and describes the nozzle seat 3451a therein. The gate pad 3457 includes a first, threaded end 3457a, a second, frustoconical outlet end 3457b, a flange 3457c between the first and second ends 3457a, 3457b and a shoulder 3457d between the flange 3457c and the first end 3457a. The flange 3457c and the shoulder 3457d both protrude outwardly. The flange 3457c is hexagonal in this example for engaging an installation tool in use. As with the recess 3456a of the gate pad receiving portion 3451, the outlet end 3457b is tapered at an included angle of between 30 and 40 degrees, approximately 35 degrees in this embodiment. The nozzle seat 3451a terminates in the outlet end 3457b of the gate pad 3457 at a central, cylindrical gate 3459 that forms an aperture through the tip of the outlet end 3457b.

In an assembled condition, the threaded end 3457a of the gate pad 3457 is received within, and in threaded engagement with, a threaded hole 3501 of the melt distributor 3500, such that a nozzle tip (not shown) extends from within the melt distributor 3500 into the nozzle seat 3451a. The hole 3501 of the melt distributor 3500 is stepped, with an enlarged pocket 3501a at the end of the threaded hole 3501 within which the shoulder 3457d is received. The shoulder 3457d is annular and is sized to provide a tight fit with the pocket 3501 to maintain alignment of the gate pad 3457 relative to the melt distributor 3500.

When the melt distributor 3500 is mounted to the cavity plate 3410, the outlet end 3457b of the gate pad 3457 is received within the gate pad receiving portion 3451 of the gate insert 3450, with their gates 3453a, 3459 aligned for receipt of molten material. This, split gate insert arrangement has been found to reduce wear that might otherwise occur due to misalignment between the nozzle tips (not shown) and gate inserts 450. It also facilitates the separation of the melt distributor 3500 from a cold half (not shown) incorporating the cavity plate assembly 3400 without the need to allow the melt distributor 3500 to cool, thereby enabling faster mold changeover. The gate pad 3457 can be configured to be a sacrificial component, reducing the wear on the gate insert 3450 and extending its useful life.

As illustrated in FIG. 38, the combined depth of the spigot 3443, gate insert 3450 and flange 3457c is slightly less than that of the cavity plate 3410, the reasons for which are described further below.

Figure 40:
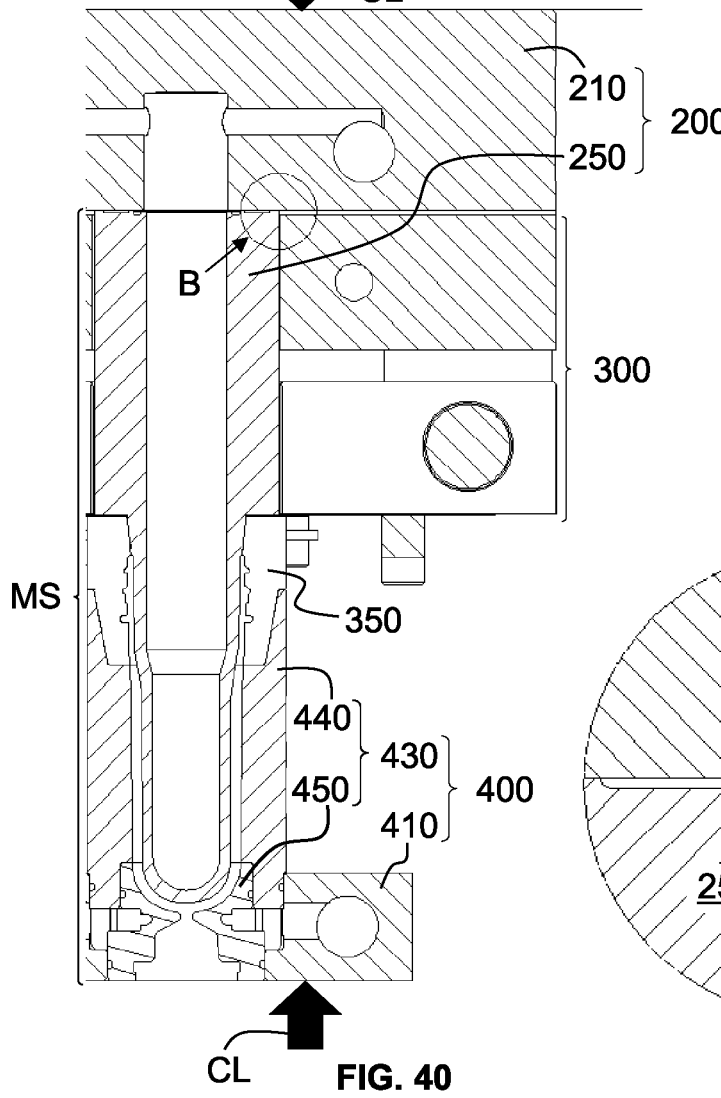
FIG. 40 depicts a partial section view of the mold of FIG. 1 illustrating one mold stack, but with the melt distributor and core cooling tube assembly both omitted.
Figure 41:
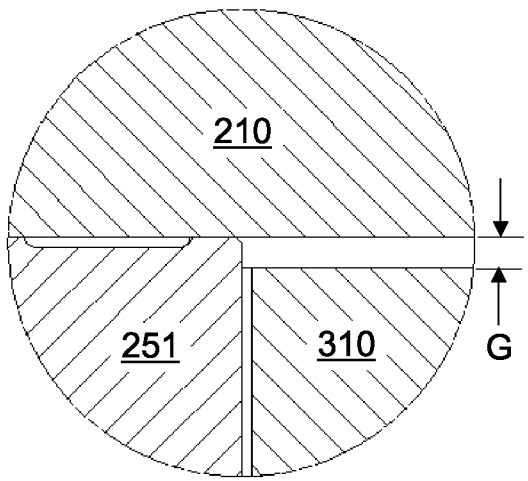
FIG. 41 depicts an enlarged view of area B of FIG. 39 illustrating the gap between the stripper plate and the core plate.

FIGS. 40 and 41 illustrate a partial section view through one of the mold stacks MS of the assembled cold half 130 illustrated in FIG. 2, with the mold stack MS shown in a molding configuration. In this, molding configuration, the top sealing surface of the preform is described in part by the top sealing surface portion TSS of the core insert 250 and in part by the neck rings 350. The components of each mold stack MS are engaged with one another in what is commonly referred to in the art as a 'cavity-lock' design. The inner taper surfaces 355e of the neck rings 350 surround the taper 253 of the core insert 250 and the lower surfaces 355d of the flange portions 355b of the neck ring 350 abut the front surface 251a of the base 251 of the core insert 250. In this example, the front surface 251a provides an annular support surface 251a which engages part of the flange portions 355b of the neck ring 350. The tapered side surfaces 355c of the neck ring 350 are received within the female taper 447 of the cavity insert 440 and the half-ring portions 355a of the neck ring 350 abut the annular step 447a or is otherwise spaced therefrom to define a narrow vent to allows air, during injection, to escape the molding cavity yet prevent outflow of molding material i.e. flash.

One significant difference from conventional molds is that the mold stack MS in this example has a stack height that is configured such that a clamping load CL applied, illustrated by the arrows in FIG. 40, applied to each of the core plate 210 and the cavity plate 410 (via the melt distributor 500) is directed substantially entirely through the mold stacks. More specifically, the distance between the neck rings 350 and the core plate 210 is greater than the thickness of the stripper plate assembly 300 received therebetween, thereby preventing the clamping load CL from being directed through the stripper plate assembly 300. In this example, this difference results in a clearance provided by a gap G between the stripper plate 310 and the core plate 210. Whilst this arrangement is preferred, it is also envisaged that the gap G may be provided between the slides 320 and the stripper plate 310 in some variations.

Moreover, the mold stacks MS in this example are configured such that the clamp load CL applied therethrough is balanced. For example, the portions of the neck rings 350 that engage the cavity insert 440, namely the tapered side surface 355c and the radial end surface of each half-ring portion 355a, have a similar projected area along the direction of the clamp load CL to that of the inner taper surface 355e and the portion of the lower surface 355d of the flange portion 355b that engages the annular support surface 251a of the core insert 250. In this example, the mold stack MS is configured such that substantially all of the clamping load CL is transmitted through the tapered side surface 355c and the radial end surface of each half-ring portion 355a, and not between the flange portions 355b of the neck ring 350 and the facing surface of the cavity insert 440.

As will be apparent to those skilled in the art, substantially all of the clamping load CL passes through the mold stacks MS, providing a separate load path through each mold stack MS. This ensures a more even and predictable distribution of the clamping load CL across the mold 100. Routing substantially all of the clamp load CL through the mold stacks MS can also eliminate the need for tonnage blocks and the need to tightly control the stripper plate 310 and bearing plate 315 thicknesses, as is required in conventional preform molds. Another consequence of eliminating the load path through the bearing plates 315 and stripper plate 310 is that the distribution and configuration of the bearing plates 315 is less critical, since they no longer play a role in distributing the clamp load evenly across the mold assembly 100. As such, their number, distribution and manufacturing tolerances is less critical.

In addition and as explained above, the end face 451*b* of the nozzle tip receiving portion 451 of the gate insert 450 is slightly recessed with respect to the rear face CVR of the cavity plate 410. This ensures that most if not all of the clamping load CL is transmitted through the cavity plate 410, avoiding any of the load being transmitted via the gate inserts 450. In the case of the alternative cavity plate assembly 3400, a similar effect is achieved by the aforementioned combined depth of the spigot 3443, gate insert 3450 and flange 3457 being slightly less than that of the cavity plate 3410.

It should be noted, however, that tonnage blocks (not shown) may be provided at predetermined positions between the core plate 210 and cavity plate 410 in order to protect the mold stacks MS from inadvertent application of excessive clamping load CL. The skilled person will also appreciate that this clearance G need not be provided between the core plate 210 and stripper plate 310. Other configurations are possible without departing from the disclosure herein. One non-limiting example would be to dimension the core insert 250, neck rings 350 and cavity insert 450, such that they are in contact with small clearances between the other, surrounding components of the mold shoe.

The mold 100 may also be configured to protect the mold stacks MS from being over stressed. For example, the mold 100 may be configured such that only a portion of the clamping load CL is directed through the mold stacks MS if a predetermined threshold clamping load CL is exceeded. This can be achieved in this example by configuring the gap G such that a portion of the clamping load CL is directed through the stripper plate assembly 300 when the predetermined clamping load CL is exceeded. More specifically, the gap G may be configured such that, once a predetermined compression of the mold stacks MS is achieved, the gap G closes and a portion of the clamping load CL is directed from the neck rings 350 through the stripper plate assembly 300 to the cavity plate 410. More preferably, however, the mold 100 may include one or more columns, or tonnage blocks (not shown), between the core plate 210 and cavity plate 410 through which a portion of the clamping load CL is directed when the predetermined clamping load CL is exceeded.

Figure 42:
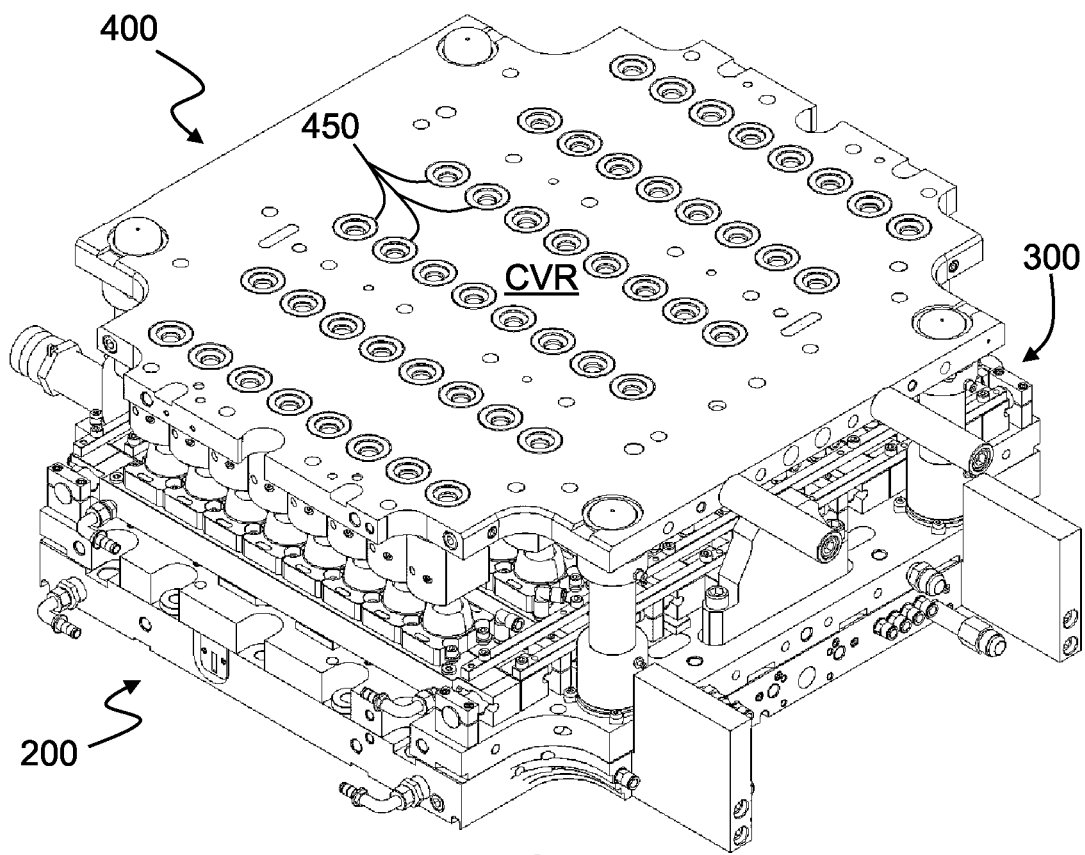
FIG. 42 depicts the cavity plate assembly of FIG. 27 being lowered onto the moving part illustrated in FIG. 21 during assembly.
Figure 43:
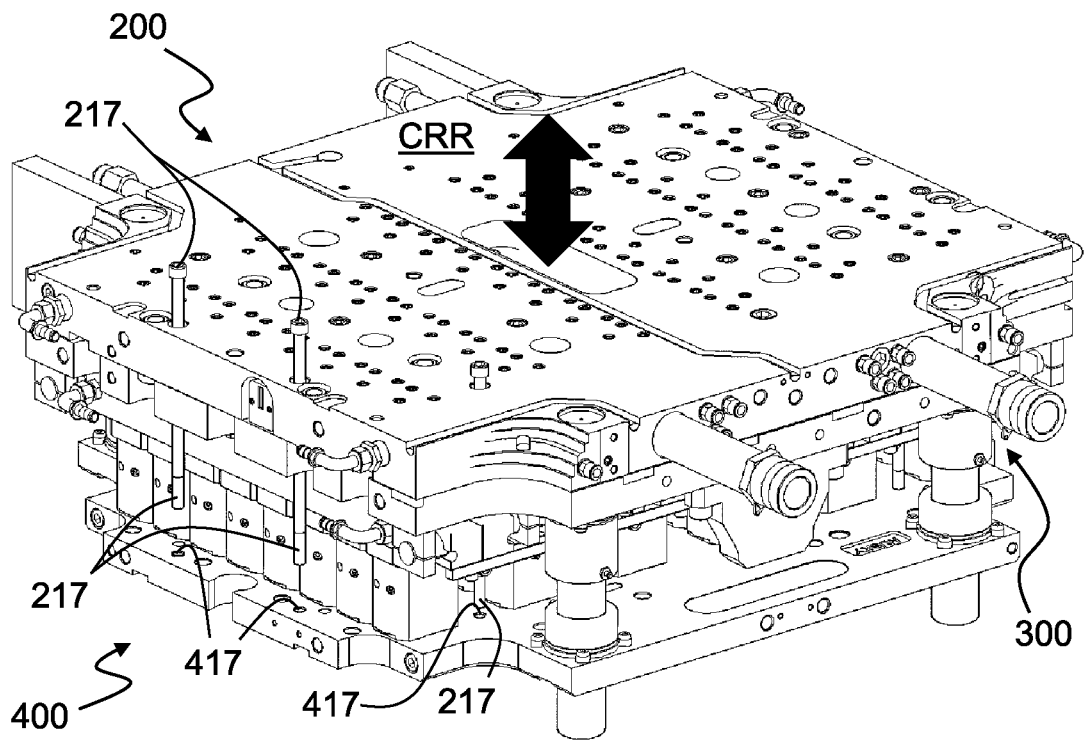
FIG. 43 depicts part of the alignment procedure for aligning the cores and neck rings relative to the cavities of the cavity plate assembly.

With reference to FIGS. 42 and 43, the mold 100 enables a novel method of aligning the mold stacks MS of the mold 100. The method of aligning the mold stacks MS involves the following steps:
  i) assembling the cavity plate assembly 400 as outlined above, ensuring that the appropriate torque is applied to the bolts 416 to ensure that the cavity assemblies 430 are properly secured to the cavity plate 410;
  ii) assembling the stripper plate assembly 300 as outlined above, with the neck rings 350 mounted to the slides 320 in a floating manner;
  iii) assembling the core plate assembly 200 as outlined above, with the core plate 210 in an upright position on a substrate and ensuring that the bolts 218 are only loosely tightened, such that the core inserts 250 are mounted loosely to the front face CRF in a floating manner;
  iv) rotating the core plate assembly 200, such that its rear face CRR rests on the substrate;
  v) lowering the stripper plate assembly 300 onto the core plate assembly 200 to form the moving part 110 shown in FIG. 21;
  vi) rotating the cavity plate assembly 400 such that the cavity assemblies 430 are lowermost;
  vii) lowering the cavity plate assembly 400 onto the moving part 110 (see FIG. 42);
  viii) installing latches (not shown) to retain the core, stripper and cavity plate assemblies 200, 300, 400, or cold half 130, together, rotating the cold half 130, such that the rear face CVR of the cavity plate 410 rests on the substrate, and removing the latches (not shown);
  ix) lifting and lowering the core plate assembly 200 relative to the stripper and cavity plate assemblies 300, 400 (see FIG. 43) repeatedly, using appropriate lifting gear (not shown), in order to align the core inserts 250 relative to the neck rings 350 and cavity inserts 450;
  x) installing and torqueing the coupling bolts 217 to engage with the coupling bolt holes 417 of the cavity plate 410, thereby securing the core plate 210 to the cavity plate 410 and securing the mold stack MS in a closed configuration, starting from the innermost bolts 217 and working out;
  xi) torqueing the bolts 218 from the rear side of the core plate 210 to secure the core inserts 250 to the core plate 210 in a fixed, aligned condition, in which they are immovable relative to the core plate 210 and aligned with the neck rings 350 and cavity inserts 450;
  xii) re-installing the latches (not shown) and rotating the cold half 130 to an upright position; and
  xiii) removing the coupling bolts 217 such that the cold half 130 is ready for installation.

In the above method, the cavity inserts 440 are the only stack components which are fixed in place initially. The neck rings 350 are secured to the slides 320 in a floating manner by virtue of the retainer mechanisms 351. Similarly, the core inserts 250 are initially mounted in a floating manner. As such, the lifting and lowering of the core plate assembly 200 in step ix) above causes the female tapers 447 of the fixed cavity inserts 440 to engage the tapered side surfaces 355*c* of the half-ring portions 355*a*, thereby aligning the neck rings 350 relative to the cavity inserts 440. In addition, the inner taper surfaces 355*e* of the neck rings 350 engage the core taper 253 of the core inserts 250, thereby aligning the core inserts 250 relative to the neck rings 350.

Whilst the rear-mounted bolts 218 provide a simple, yet effective means of fixing the core inserts 250, 1250 from their floating condition with the mold 100 in an assembled condition, other arrangements are envisaged. For example, the bolts 218 may be replaced by another fastening means, preferably one which is operable without access to the front of at least some of the core inserts 250, 1250. The fastening means may be operable either from the rear side of the core plate 210 or from some other accessible region (e.g. a side, top or bottom) of the mold 100 when it is in the assembled condition. Moreover and as indicated above, although the mounting surface 254 is free of any projections, the core insert 250 could be provided with a spigot that extends from the mounting surface 254 that is smaller than the seat 215 in the core plate 210 to enable some sliding movement therebetween. Indeed, in some examples the spigot may be substantially the same size as the seat 215 in the core plate 210.

It will be appreciated by those skilled in the art that the floating neck rings 350 may be replaced with conventional neck rings 350. The conventional neck rings (not shown) may be mounted loosely to the slides 320, such that they are free to float, for the duration of the aforementioned procedure. The neck ring bolts could then be torqued to secure them in place after the mold 100 is installed in the machine (not shown). Other configurations and approaches are also envisaged. For example, the procedure outlined in CA2741937 may be employed, wherein the cavity mounting holes 444 are aligned with mounting holes of the conventional neck rings (not shown) and some of the cavity mounting bolts 416 are omitted during the alignment procedure. This enables a tool (not shown) to be inserted through the cavity mounting holes 444 to torque the neck ring mounting bolts (not shown) before the coupling bolts 217 are removed at step xiii of the aforementioned alignment procedure.

It will be appreciated that the configuration of the elements of the molding system 100 may vary, particularly although not exclusively as described above. For example, whilst the annular support surface 251a of the core insert 250 is perpendicular to a longitudinal axis of the core, it may be angled or tapered. It may be particularly advantageous for the annular support surface 251a to be angled or tapered, for example to provide a recess, e.g. a conical recess. This could be configured to provide an inward force to the neck rings 350 under the clamping load CL, for example to inhibit them from separating by the pressure of molten plastic during injection. This may be a shallow recess, for example angled less than 10 degrees. Moreover, the closed end of the core inserts 250 may be conical or any other suitable shape. The shape of the core cooling tubes 1270, 2270, 3270 may also be shaped to approximate such different shapes.

It will also be appreciated by those skilled in the art that several variations to the construction and/or use of aforementioned examples are envisaged without departing from the scope of the invention. It will also be appreciated by those skilled in the art that any number of combinations of the aforementioned features and/or those shown in the appended drawings provide clear advantages over the prior art and are therefore within the scope of the invention described herein.

The invention claimed is:
1. An injection mold comprising:
   a core plate assembly, a cavity plate assembly and a stripper plate assembly arranged between the core and cavity plate assemblies;
   a plurality of mold stacks, each of which includes a core insert, a cavity insert and a split mold insert pair arranged therebetween;
   the core plate assembly including a core plate having a plurality of the core inserts mounted thereon;
   the stripper plate assembly including a stripper plate with a bearing surface upon which a plurality of slide pairs are slidably supported, each slide pair being configured to retain a subset of the split mold inserts thereon;
   the cavity plate assembly including a cavity plate having a plurality of the cavity inserts mounted thereon;
   wherein the mold comprises a molding configuration in which the mold stacks are closed to define molding cavities and the stack height is configured such that a clamping load applied, in use, to urge the core plate toward the cavity plate is directed substantially entirely through the mold stacks;
   wherein the distance between the split mold inserts and the core plate, when the mold is in the molding configuration, is greater than the thickness of the stripper plate assembly received therebetween, thereby to prevent the clamping load from being directed through the stripper plate assembly.

2. An injection mold according to claim 1, wherein a gap is provided between the core plate and the stripper plate when the mold is in the molding configuration.

3. An injection mold according to claim 1, wherein a gap is provided between the slides and the bearing surface when the mold is in the molding configuration.

4. An injection mold according to claim 3, wherein the distance between the slides and the core plate, when the mold is in the molding configuration, is greater than the thickness of the stripper plate, thereby providing the gap.

5. An injection mold according to claim 1, wherein each cavity insert comprises a spigot received in a respective seat of the cavity plate and a shoulder surrounding at least part of the spigot and engaging a front face of the cavity plate, wherein the spigot is shorter than the depth of the cavity plate such that substantially all of the applied clamping load is directed from the core plate through the mold stack to the cavity plate.

6. An injection mold according to claim 5 comprising a gate insert received within each seat of the cavity plate which cooperates with the cavity insert spigot received therein to enable molten material to be injected into the cavity, wherein the gate inserts are recessed with respect to a rear, melt distributor mounting face of the cavity plate to substantially inhibit the applied clamping load from being directed from the melt distributor through the gate inserts.

7. An injection mold according to claim 1, wherein the split mold insert pair describes a first taper on a first side, which engages a corresponding taper of the cavity insert, a second taper on a second side, which engages a corresponding taper of the core insert, and a radial surface extending from the second taper, a portion of which engages an annular support surface of the core insert, the projected area of the first taper in the direction of the clamping load being substantially the same as that of the second taper and radial surface portion.

8. An injection mold according to claim 1, wherein only a portion of the clamping load is directed through the mold stacks if a predetermined threshold clamping load is exceeded.

9. An injection mold according to claim 8 comprising one or more columns between the core plate and cavity plate, wherein at least a portion of the clamping load is directed through the one or more columns if the predetermined clamping load is exceeded.

10. An injection mold according to claim 9, wherein at least a portion of the clamping load is directed through the stripper plate assembly if the predetermined clamping load is exceeded.

11. An injection mold according to claim 1, wherein the stripper plate assembly comprises a pair of guide shafts secured, in parallel, across opposing sides of the stripper plate, each slide of each slide pair slidably receiving one of the guide shafts through each of its ends such that each slide is movable along the pair of guide shafts relative to the stripper plate and relative to one another.

12. An injection mold according to claim 11 comprising a pair of connecting bars mounted to the slide pairs, wherein each connecting bar secures together a respective one of the slides of each slide pair for synchronized movement thereof.

13. An injection mold comprising:
   a core plate assembly, a cavity plate assembly and a stripper plate assembly arranged between the core and cavity plate assemblies;

a plurality of mold stacks, each of which includes a core insert, a cavity insert and a split mold insert pair arranged therebetween;

the core plate assembly including a core plate having a plurality of the core inserts mounted thereon;

the stripper plate assembly including a stripper plate with a bearing surface upon which a plurality of slide pairs are slidably supported, each slide pair being configured to retain a subset of the split mold inserts thereon;

the cavity plate assembly including a cavity plate having a plurality of the cavity inserts mounted thereon;

wherein the mold comprises a molding configuration in which the mold stacks are closed to define molding cavities and a gap is provided between the core plate and the stripper plate such that a clamping load applied, in use, to urge the core plate toward the cavity plate is directed substantially entirely through the mold stacks.

14. A mold stack for use in an injection mold according to claim 13, the mold stack comprising a core insert, a cavity insert and a split mold insert pair arranged therebetween, wherein the mold stack comprises a closed, molding configuration in which molding cavities are defined therebetween and in which a clamping load applied, in use, to urge a core plate, to which the core insert is mounted, toward a cavity plate, to which the cavity insert is mounted, is directed substantially entirely through the mold stacks.

15. A mold stack according to claim 14, wherein the split mold insert pair describes a first taper on a first side, which engages a corresponding taper of the cavity insert, a second taper on a second side, which engages a corresponding taper of the core insert, and a radial surface extending from the second taper, a portion of which engages an annular support surface of the core insert, the projected area of the first taper in the direction of the clamping load being substantially the same as that of the second taper and radial surface portion.

* * * * *